US011741778B2

(12) United States Patent
Shaffer, Jr. et al.

(10) Patent No.: US 11,741,778 B2
(45) Date of Patent: *Aug. 29, 2023

(54) ELECTRONIC GAMING MACHINE ARCHWAY WITH OVERHEAD DISPLAY DEVICES

(71) Applicant: Aristocrat Technologies, Inc., Las Vegas, NV (US)

(72) Inventors: Stephen Shaffer, Jr., Las Vegas, NV (US); Frank Rodriguez, Las Vegas, NV (US); Bruce Urban, Las Vegas, NV (US); Alfred Thomas, Ventura, CA (US); Rajendrasinh Jadeja, Las Vegas, NV (US); Matthew McKay, Henderson, NV (US); Ariel Turgel, San Francisco, CA (US); Daniel Harden, Palo Alto, CA (US); Elliot Ortiz, San Francisco, CA (US); Hirotomi Teranishi, San Jose, CA (US); Joseph Kaminkow, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,424

(22) Filed: Mar. 22, 2022

(65) Prior Publication Data

US 2022/0215717 A1    Jul. 7, 2022

Related U.S. Application Data

(63) Continuation of application No. 16/890,634, filed on Jun. 2, 2020, now Pat. No. 11,308,753.

(Continued)

(51) Int. Cl.
*G07F 17/32* (2006.01)
*G06F 3/14* (2006.01)

(52) U.S. Cl.
CPC ........ *G07F 17/3216* (2013.01); *G06F 3/1446* (2013.01); *G07F 17/3213* (2013.01); *G07F 17/3227* (2013.01)

(58) Field of Classification Search
CPC ............. G07F 17/3216; G07F 17/3213; G07F 17/3227; G06F 3/1446; G06F 3/1423
See application file for complete search history.

(56) References Cited

U.S. PATENT DOCUMENTS

| 5,611,174 A | 3/1997 | Hayashi |
| 5,772,311 A | 6/1998 | Williams |

(Continued)

OTHER PUBLICATIONS

Ngapleaz, Manchester Airport terminal 2, en.wikipedia.org/wiki/File:Manchester_airport_terminal_2jpg, Jun. 1, 2016.

(Continued)

*Primary Examiner* — Kevin Y Kim
(74) *Attorney, Agent, or Firm* — Armstrong Teasdale LLP

(57) ABSTRACT

An electronic gaming machine (EGM) archway includes a first EGM including at least one first curved display device, the at least one first curved display device defining a first portion of the archway. The EGM archway also includes a second EGM including at least one second curved display device, the at least one second curved display device defining a second portion of the archway, the second EGM spaced apart from and diametrically opposing the first EGM. In addition, the EGM archway includes an overhead display portion including at least one third display device, the at least one third display device defining a third portion of the archway, the overhead display portion extending overhead between the at least one first curved display device and the at least one second curved display device.

20 Claims, 52 Drawing Sheets

Related U.S. Application Data

(60) Provisional application No. 62/913,504, filed on Oct. 10, 2019, provisional application No. 62/869,452, filed on Jul. 1, 2019.

(56) References Cited

U.S. PATENT DOCUMENTS

| | | | |
|---|---|---|---|
| D618,682 S | 6/2010 | Haase | |
| D646,336 S | 10/2011 | Kelly | |
| D673,203 S | 12/2012 | Jacques | |
| 8,922,531 B2 | 12/2014 | Lee | |
| 8,979,303 B2 | 3/2015 | Adams | |
| D744,579 S | 12/2015 | Cope | |
| D747,718 S | 1/2016 | Drabant | |
| RE46,169 E | 10/2016 | Kelly | |
| D770,406 S | 11/2016 | Fleming, Jr. | |
| D786,242 S | 5/2017 | Ho | |
| 9,677,288 B2 | 6/2017 | Peck | |
| D796,700 S | 9/2017 | Walter | |
| D808,964 S | 1/2018 | Asamizu | |
| D823,856 S | 7/2018 | Asamizu | |
| D842,932 S | 3/2019 | Stair | |
| D842,933 S | 3/2019 | Castro | |
| D843,480 S | 3/2019 | Castro | |
| D843,482 S | 3/2019 | Holland | |
| D850,536 S | 6/2019 | Stair | |
| D850,537 S | 6/2019 | Urban | |
| D863,441 S | 10/2019 | Hwang | |
| D876,543 S | 2/2020 | Kim | |
| D898,225 S | 10/2020 | Rossborough, Jr | |
| D916,969 S | 4/2021 | Fleming, Jr. | |
| D954,829 S | 6/2022 | Olive | |
| 2003/0151562 A1 | 8/2003 | Kulas | |
| 2004/0048646 A1 | 3/2004 | Martin | |
| 2004/0204235 A1 | 10/2004 | Walker | |
| 2005/0003880 A1 | 1/2005 | Englman | |
| 2008/0002161 A1 | 1/2008 | Streid | |
| 2008/0020823 A1 | 1/2008 | Cuddy | |
| 2008/0045320 A1 | 2/2008 | Kato | |
| 2008/0207308 A1 | 8/2008 | Yoshizawa | |
| 2011/0034239 A1 | 2/2011 | Collette | |
| 2011/0092271 A1 | 4/2011 | Nguyen | |
| 2012/0252562 A1 | 10/2012 | Aoki | |
| 2013/0184078 A1 | 7/2013 | Brunell | |
| 2013/0274016 A1 | 10/2013 | Gagner | |
| 2013/0321740 A1 | 12/2013 | An | |
| 2014/0333507 A1 | 11/2014 | Welck | |
| 2015/0018070 A1 | 1/2015 | Meyer | |
| 2015/0168792 A1 | 6/2015 | Woo | |
| 2017/0169654 A1 | 6/2017 | Sue | |
| 2018/0082523 A1 | 3/2018 | Palermo | |

OTHER PUBLICATIONS

Clubit, LG OLED TV Tunnel at CES 2017, www.youtube.com/watch?v=Ar1JF-Acr-o, Jan. 17, 2017.
LG Newsroom, World's Largest OLED Tunnel Welcomes Visitors to IFA With 450 Million Brilliant Pixels, wwwlgnewsroom.com/2016/09/worids-largest-oled-tunnel-welcomes-visitors-to-ifa-with-450-Tiillion-brilliant-pixels//, Sep. 1, 2016.
Fremont Street Experience, Viva Vision Light Shows at Fremont Street Experience, www.youtube.com/watch?v=cddjEysQ-Fc, Aug. 8, 2016.
Cooper, J., Bude Tunnel's bizarre but beautiful Christmas spectacle finishes today, www.comwalllive.com/news/cornwall-news/bude-tunnels-bizarre-beautiful-christmas-2333084, Dec. 16, 2018.
R360, SEGA RETRO, https://segaretro.org/R360, 3 pages.
Beyman, Alex., "Gundam Battle Pods: Japanese Arcades are INSANE," https://medium.com/future-vision/gundam-battle-pods-japanese-arcades-are-insane-9b89d88b291, May 20, 2019, 6 pages.
Eclipse PhotoBooth, Digital Centre, https://www.youtube.com/watch?v=YMNigd4Kz2l, Nov. 14, 2016.
Dodd, Bill., "Dome Gaming Build," http://arcadeshenanigans.com/blog/2015/10/1/dome-gaming-build, Oct. 1, 2015, 45 pages.
20' Custom Modular DesignLine Island, Nomadic Display, https://www.nomadicdisplay.com/displays/designs/D41814N, 1 page.
IWR1 IMPERATORWORKS Brand Gaming chair, IMPERATOR WORKS, https://www.amazon.com/IWR1-IMPERATORWORKS-Gaming-Computer-Monitors/dp/B07BKT53K7, 8 pages.
Time-Out Arcade: Amazing Classic Arcade Pictures, The Arcade Blogger, https://arcadeblogger.com/2017/08/18/time-out-arcade-amazing-classic-arcade-pictures/, 26 pages.
Urban Furniture Design, Ideias Diferentes, https://www.pinterest.com/pin/214272894749490017/, 1 page.
Droian Workstation, Discover ideas about Gaming Room Setup, https://www.pinterest.com/pin/214976582198394589/, 1 page.
Guangzhou Zhuoyuan Virtual Reality Tech Co., Ltd., Made-in-China, https://7dcinema.en.made-in-china.com/product/QCjJZbnyLrVO/China-Amusement-Equipment-720-Degree-Rotary-Space-Time-Shuttle-Simulator-Rotation-Arcade-Game-Machine.html, 1 page.
P2.5 Curve Full Color Led Display Video Wall Screen, Helilai Technology Co., Ltd, http://www.hll-ledscreens.com/led-diaplay/p2-5-curve-full-color-led-display-video-wall.html, 6 pages.
LED Curtain Light, Ali Express, https://www.aliexpress.com/item/32885271821.html, 9 pages.
Walking tour of Fremont Street at Night in Downtown Las Vegas Travel Guide, Wind Walk Travel Videos, https://www.youtube.com/watch?v=O05J_EE7cMs, Jun. 30, 2018.
Yin, Lana., Led display time tunnel . . . led display factory can make it for you, https://www.youtube.com/watch?v=W7O9OOz90-w, Dec. 27, 2017.
Cristino, Nuno., "OLED tunnel: artistic space beyond display and imagination," LG Magazine, https://www.lg.com/uk/lg-magazine/what-is-new/lg-oled-tunnel-artistic-space-beyond-display-and-imagination, Feb. 9, 2017, 5 pages.
Tarosky, Matt., "Tunnels," BRDG Studios, https://brdg.co/tunnels/, Aug. 31, 2016, 33 pages.
Haynes, Dave., "LED Tunnel Creates Immersive Experience for MLB All-Star Fans," SIXTEEN-NINE, https://www.sixteen-nine.net/2017/09/22/led-tunnel-creates-immersive-experience-for-mlb-all-star-fans/, Sep. 22, 2017, 7 pages.
Tunnel of Lights Made of Millions of LEDs in Japan, BOREDPANDA, https://www.boredpanda.com/led-light-tunnel-japan/?utm_source=google&utm_medium=rganic&utm_campaign=organic, 8 pages.
Aquarium Displays, ATL Leaders in Aquarium Technology, https://www.aquariumtechnology.com/aquariums/#ocean, 13 pages.
Office Action dated Jul. 1, 2021 for U.S. Appl. No. 16/896,952 (pp. 1-18).
Office Action (Final Rejection) dated Nov. 24, 2021 for U.S. Appl. No. 16/896,952 (pp. 1-18).
Office Action (Notice of Allowance and Fees Due (PTOL-85)) dated Jan. 5, 2022 for U.S. Appl. No. 16/890,634 (pp. 1-8).
Office Action (Non-Final Rejection) dated Mar. 2, 2022 for U.S. Appl. No. 16/896,952 (pp. 1-21).
Office Action (Notice of Allowance and Fees Due (PTOL-85)) dated Aug. 1, 2022 for U.S. Appl. No. 16/896,952 (pp. 1-8).

ELECTRONIC GAMING MACHINE ARCHWAY WITH OVERHEAD DISPLAY DEVICES

CROSS REFERENCE TO RELATED APPLICATIONS

This application is a continuation of and claims priority to U.S. patent application Ser. No. 16/890,634, filed Jun. 2, 2020, which claims the benefit of and priority to U.S. Provisional Patent Application No. 62/913,504, filed Oct. 10, 2019, and U.S. Provisional Patent Application No. 62/869,452, filed Jul. 1, 2019, the disclosures of which are hereby incorporated by reference in their entireties.

TECHNICAL FIELD

The field of disclosure relates generally to electronic gaming, and more particularly, to an electronic gaming machine (EGM) archway that includes an overhead display device that can be combined with one or more other EGM archways to form a plurality of EGM archways with overhead displays.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In addition, casinos typically include stand-alone EGMs and/or EGMs arranged in groups, along walls, or in clusters often referred to as "banks." However, even in clusters or banks, traditional arrangements of EGMs are typically limited to stand-alone or independently generated graphics, and conventional systems do not include any mechanism for displaying continuous graphics between EGMs.

SUMMARY

In one aspect, an electronic gaming machine (EGM) archway is provided. The EGM archway includes a first EGM including at least one first curved display device, the at least one first curved display device defining a first portion of the archway. The EGM archway also includes a second EGM including at least one second curved display device, the at least one second curved display device defining a second portion of the archway, the second EGM spaced apart from and diametrically opposing the first EGM. In addition, the EGM archway includes an overhead display portion including at least one third display device, the at least one third display device defining a third portion of the archway, the overhead display portion extending overhead between the at least one first curved display device and the at least one second curved display device.

In another aspect, an electronic gaming system is described. The system includes a first EGM including a first display device, a second EGM including a second display device, the second EGM spaced apart from and opposing the first EGM, and an overhead display portion including a third display device. The overhead display portion extends overhead between the first display device of the first EGM and the second display device of the second EGM, whereby the first display device, the second display device, and the third display device form at least a portion of an archway that players are able to enter under. The system also includes a processor and a memory device configured to store computer-readable instructions, which when executed by the processor, cause the processor to at least: control the first display device, the second display device, and the third display device to display a graphic that moves between at least two of the first display device, the second display device, and the third display device, whereby the graphic appears to traverse at least a portion of the archway.

In yet another aspect, an EGM archway is described. The EGM archway includes a first EGM receptacle configured to receive a first EGM, a second EGM receptacle configured to receive a second EGM, the second EGM receptacle spaced apart from and opposing the first EGM receptacle. The EGM archway also includes an overhead display portion including an overhead display device, the overhead display portion configured to be positioned overhead between the first EGM receptacle and the second EGM receptacle, whereby the first EGM receptacle, the second EGM receptacle, and the overhead display device form at least a portion of the EGM archway.

BRIEF DESCRIPTION OF THE DRAWINGS

An example embodiment of the subject matter disclosed will now be described with reference to the accompanying drawings.

DETAILED DESCRIPTION

Several EGM archways are described herein. These EGM archways may include a plurality of EGMs, arranged in spatially opposing pairs, each having one or more curved display screens. The curved display screens of each EGM pair may form a lower portion of an arch of either archway, and a plurality of curved and/or planar display screens may be added between the two lower portions of either archway to complete the arch of the archways. In addition, EGMs may be positioned side-by-side to create longitudinally extending archways (e.g., longer or shorter archways), such as ring-shaped and tunnel-shaped archways. Many other shapes are also possible, as described herein. For example, two archways may be positioned perpendicular to one another to form a cluster of overhead archways. Furthermore, these side-by-side EGMS may be separated and/or interconnected by one or more intermediate or spacer display screens that are in communication with the archway. In operation, a variety of animations and graphics may be displayed within the archways, and EGMs forming the archways may interact or influence each other, such as by sending graphics or game awards across the archways to one or more other EGMs.

Figure 1:
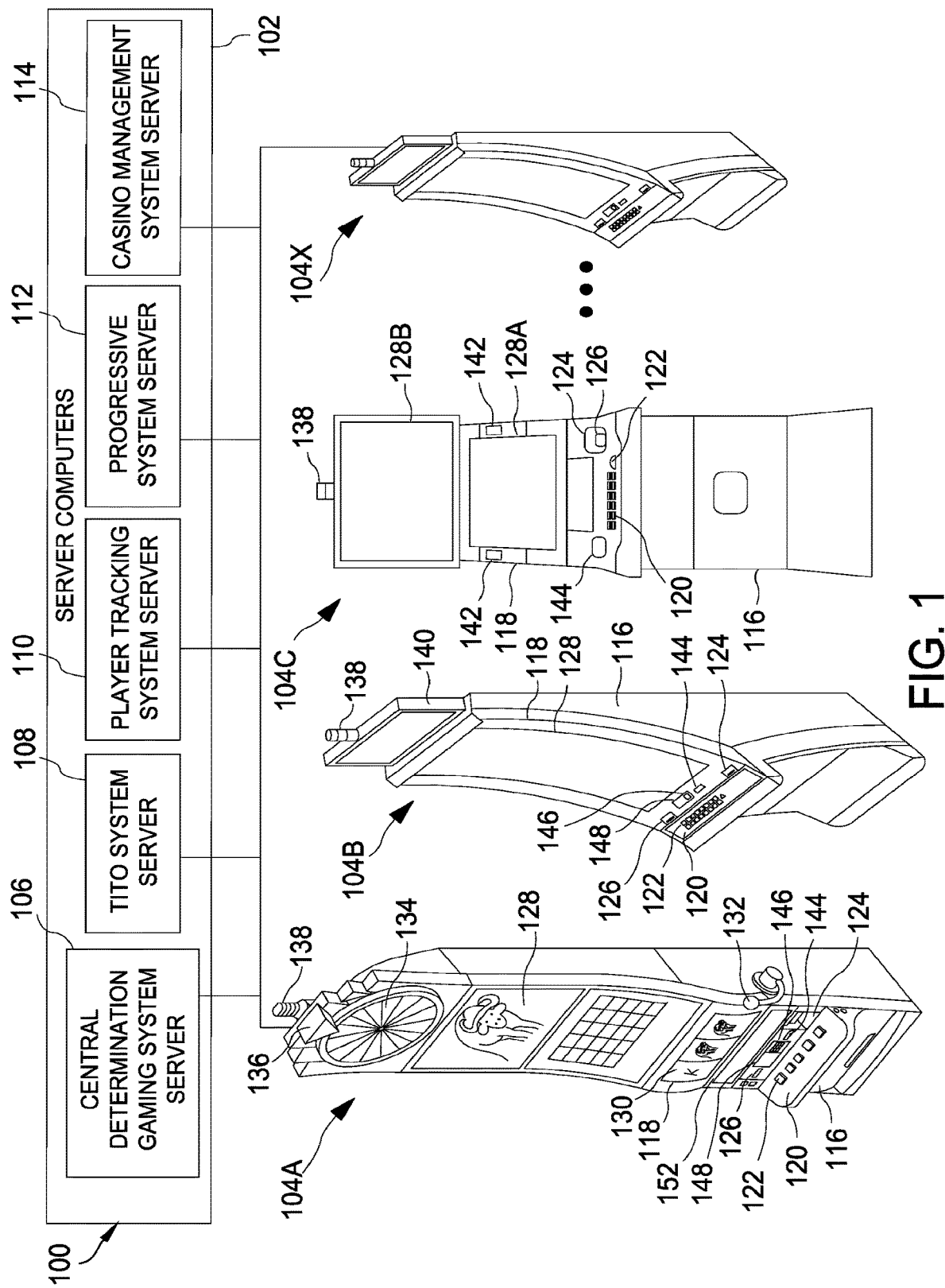
FIG. 1 is an example diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
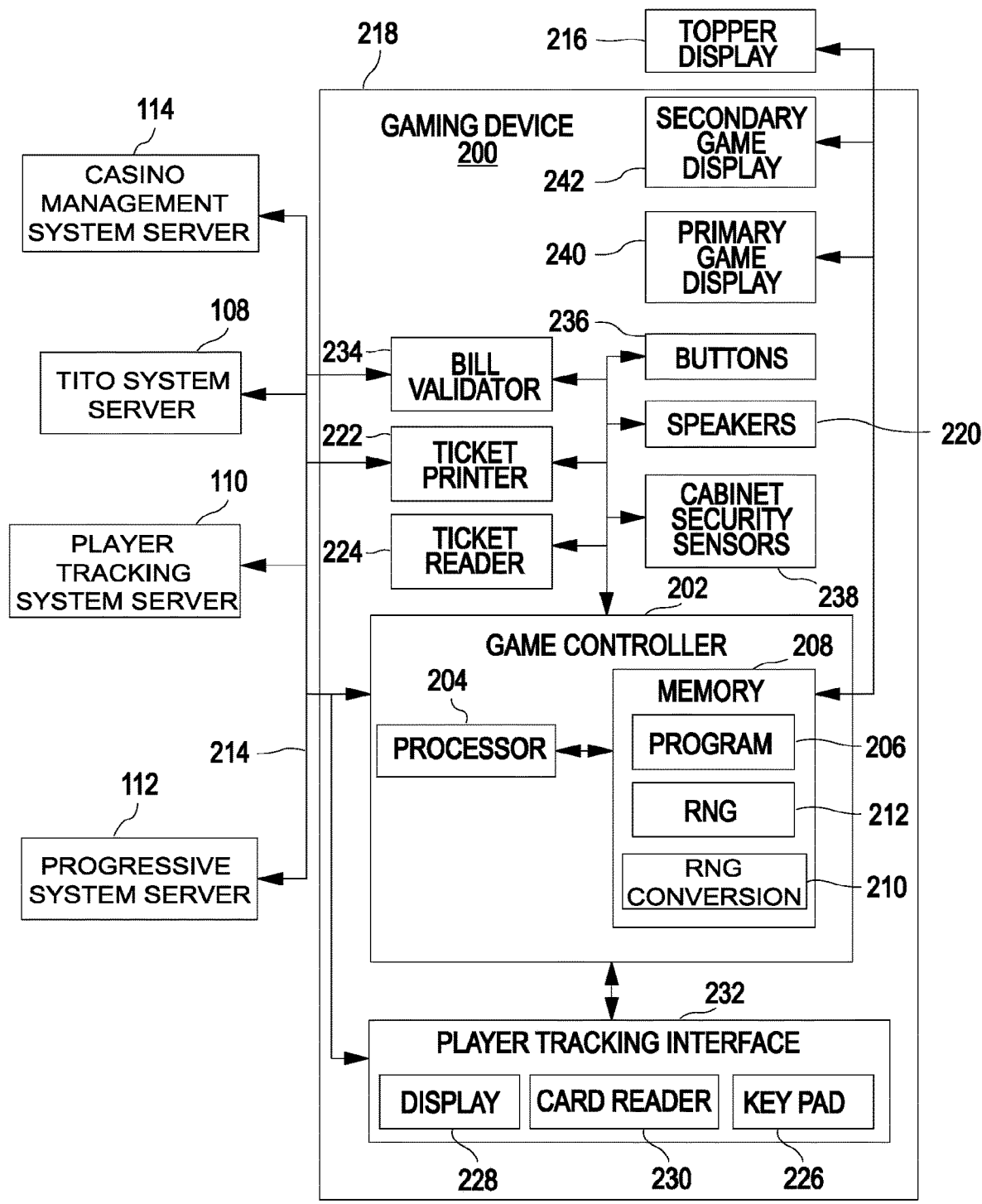
FIG. 2 is a block diagram showing various functional elements of an example EGM.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
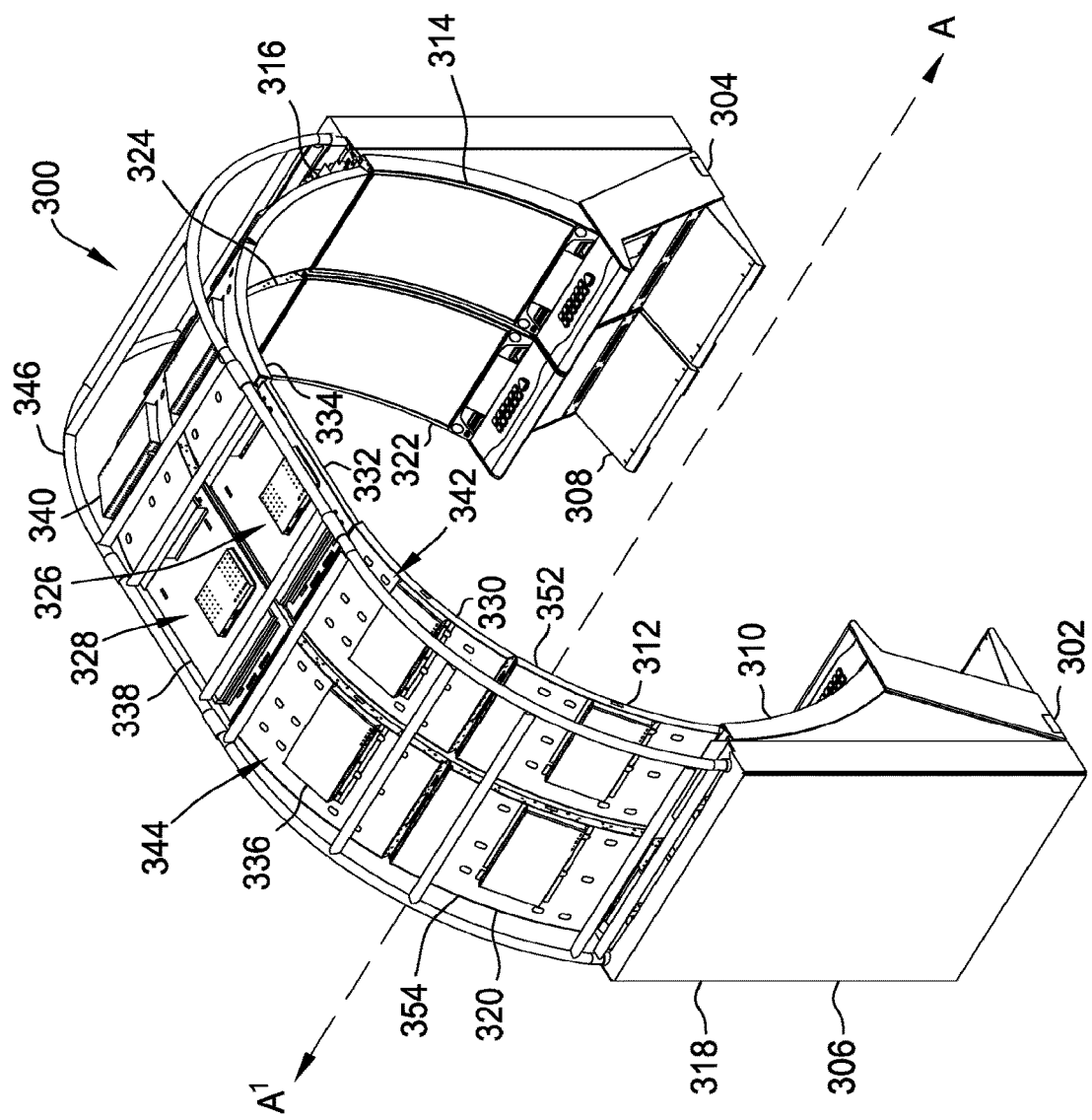
FIG. 3 is a perspective view of a first example embodiment of an EGM archway including a plurality of EGMs, as shown in FIG. 1 and FIG. 2.
Figure 4:
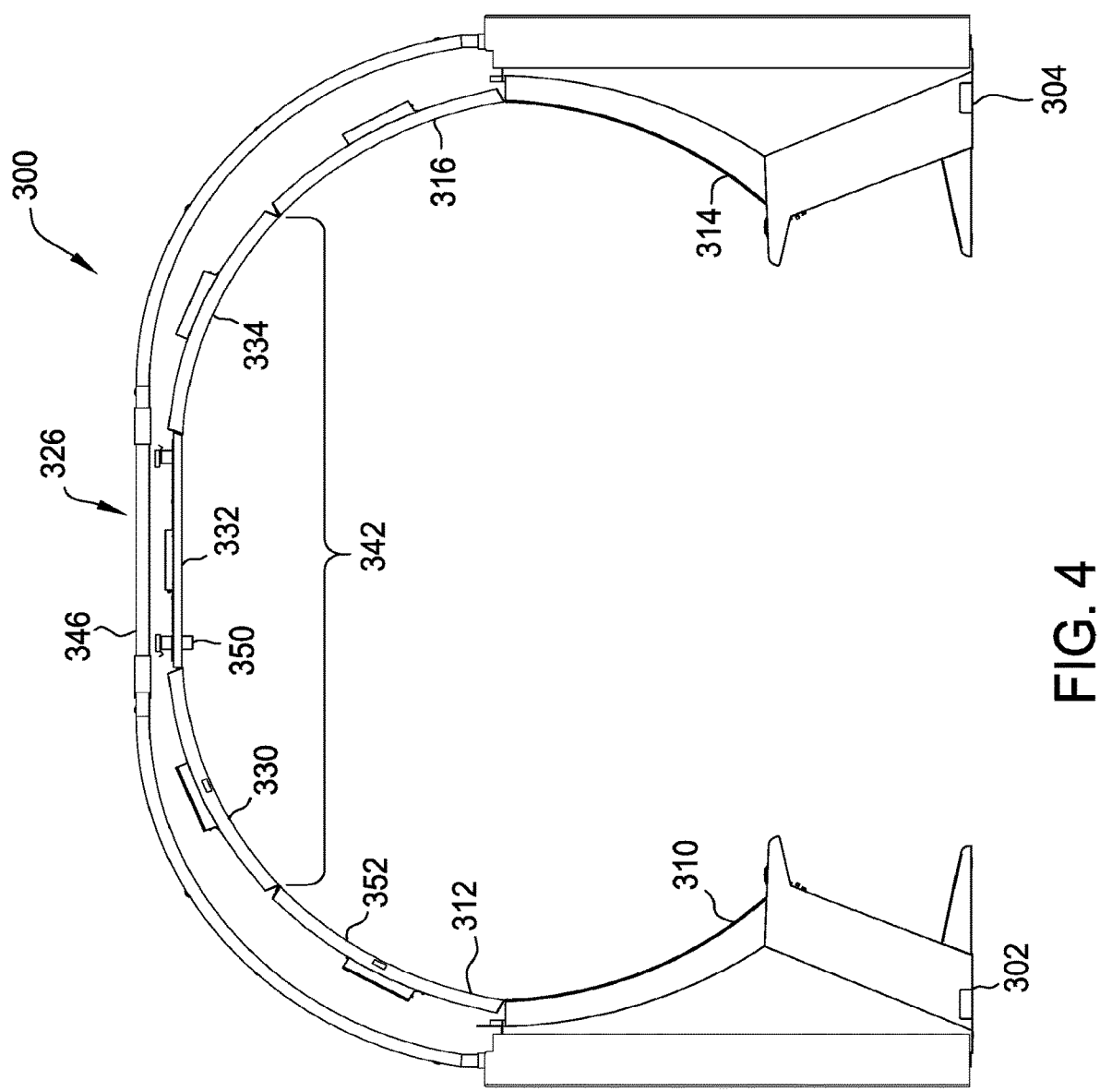
FIG. 4 is a side view of the first example embodiment of the EGM archway shown in FIG. 3.

FIG. 3 is a perspective view of a first example embodiment of an EGM archway 300. Likewise, FIG. 4 is a side view of the first example embodiment of EGM archway 300. EGM archway 300 extends axially along a centerline A-A'.

Accordingly, in the first example embodiment, EGM archway 300 includes a first EGM 302, a second EGM 304, a third EGM 306, and a fourth EGM 308. In general, EGMs 302-308 may include any suitable electronic gaming machine or gaming device, such as any of EGMs 104A-104X, as described herein. EGMs 302-308 may also include any of the computer architecture shown in FIG. 2 (with reference to gaming device or EGM 200). EGMs 302-308 are illustrated as including curved display screens in FIG. 3. In some embodiments, EGMs 302-308 include curved display screens positioned in a different orientation than the portrait orientation shown in FIG. 3 (e.g., a landscape orientation). In some embodiments, EGMs 302-308 may include flat display screens (e.g., in a portrait or landscape orientation) in addition to, or in place of, the curved display screens shown in FIG. 3. In various embodiments, EGMs 302-308, and other EGMs described herein, may include any combination of displays of different shapes, sizes, and orientations.

As described in additional detail herein, although archway 300 includes side-by-side EGMs (i.e., EGMs 302 and 306 on one side and EGMs 304 and 308 on another side), in various embodiments, archways of the present disclosure, including archway 300, may only include a single pair of opposing or spatially opposite EGMs (e.g., EGMs 302 and 304). Likewise, as described herein, any of archways described herein, such as archway 300, may include multiple pairs of spatially opposite EGMs to create tunnel- and other-shaped archways.

First EGM 302 includes at least a first curved display device 310 and a second curved display device 312. Second EGM 304 includes at least a first curved display device 314 and a second curved display device 316. Third EGM 306 includes at least a first curved display device 318 and a second curved display device 320. Fourth EGM 308 includes at least a first curved display device 322 and a second curved display device 324. Although in this example embodiment, each EGM 302-308 includes two curved display devices (e.g., two curved display screens), in other embodiments, any other number of curved display devices may be included in any of EGMs 302-308.

In some embodiments, the curved display devices of each EGM 302-308 may be mechanically and/or electrically coupled to create a larger curved display of each EGM 302-308. For example, first curved display device 310 and second curved display device 312 may be mechanically and/or electrically coupled to create a larger curved display of EGM 302. The same may be true for the remaining EGMs 304-308. Although each EGM 302-308 includes two curved display devices in this example, it will be appreciated that any number of curved display devices may be provided in association with an EGM 302-308 (including a single curved display device), and that as a number of curved display devices are adjusted or changed, a curvature or arc associated with each EGM 302-308 may also be changed or adjusted (e.g., to increase and/or decrease, as the case may be).

In addition, in at least some embodiments, first EGM 302 may be spaced apart from and diametrically opposed to second EGM 304, such that EGMs 302 and 304 are spatially opposite and facing one another. Similarly, third EGM 306 may be spaced apart from and diametrically opposed to fourth EGM 308, such that EGMs 306 and 308 are spatially opposite and facing one another.

As a result, first EGM 302 and second EGM 304 may together define opposing lower or non-overhead portions of a first archway section 326, and third EGM 306 and fourth EGM 308 may together define opposing lower or non-overhead portions of a second archway section 328. As shown, first archway section 326 and second archway section 328 may abut one another, such that archway 300 is substantially continuous in a direction extending parallel to axis A-A'. For convenience, as used herein, the axis A-A' may be referred to as extending "longitudinally" or in a "longitudinal direction." A direction substantially orthogonal to axis A-A' may be referred to as extending "latitudinally," where the curvature of archway 300 thus generally follows or extends along the latitudinal direction.

In addition, it will be appreciated that any number of EGMs may be arranged along axis A-A' to create an archway 300 of any length along axis A-A'. For example, in some embodiments, archway 300 may include only a single pair of EGMs, such as EGMs 302 and 304, to define a ring-shaped archway. In another embodiment, archway 300 includes EGMs 302-308 to define a short tunnel-shaped archway having two sections 326 and 328, and in yet another embodiment, archway 300 includes greater than four EGMs to define a longer tunnel-shaped archway (extending longitudinally along the axis A-A') having, for example, greater than two sections.

In addition to the portions of each archway section 326 and 328 defined by EGMs 302-308 (e.g., the lower or substantially non-overhead portions), in various embodiments, one or more display devices may be mechanically and/or electrically coupled between first EGM 302 and second EGM 304. Likewise, one or more display devices may be mechanically and/or electrically coupled between third EGM 306 and fourth EGM 308.

More particularly, in at least the first example embodiment, a first overhead display device 330, a second overhead display device 332, and a third overhead display device 334 may extend between first EGM 302 and second EGM 304. Similarly, a fourth overhead display device 336, a fifth overhead display device 338, and a sixth overhead display device 340 may extend between third EGM 306 and fourth EGM 308.

Overhead display devices 330-340 may include a variety of shapes and may be joined or coupled, as shown and described, between respective EGMs 302-308 to define one or more overhead portions of archway 300. Specifically, first overhead display device 330, second overhead display device 332, and third overhead display device 334 may extend between first EGM 302 and second EGM 304 to define a first overhead display portion 342. Similarly, fourth overhead display device 336, fifth overhead display device 338, and sixth overhead display device 340 may extend between third EGM 306 and fourth EGM 308 to define a second overhead display portion 344.

In some embodiments, overhead display devices 330-340 may include any of a variety of active display devices (e.g., LED panels, OLED devices, plasma or other displays, and the like). However, in at least some embodiments, overhead display devices 330-340 may include projection surfaces rather than active display devices. In such embodiments, one or more projectors within archway 300 may display a projection image within archway 300. One technical improvement facilitated by such embodiments is that a weight of archway 300 is substantially reduced, making installation more convenient and reliable, and improving the safety of the overhead archway. Further, a total cost of archway 300 may be reduced.

As shown, in at least one embodiment, first overhead display device 330 includes a curvature and extends from an edge of second display device 312 of first EGM 302. Likewise, third overhead display device 334 includes a curvature and extends from an edge of second display device 316 of second EGM 304. Second overhead display device 332 is substantially planar and extends overhead between first overhead display device 330 and third overhead display device 334 to complete first section 326 of archway 300 between first EGM 302 and second EGM 304. In other embodiments, second overhead display device 332 may also include a curvature.

Similarly, fourth overhead display device 336 includes a curvature and extends from an edge of second display device 320 of third EGM 306. Likewise, sixth overhead display device 340 includes a curvature and extends from an edge of second display device 324 of fourth EGM 308. Fifth overhead display device 338 is substantially planar and extends overhead between fourth overhead display device 336 and sixth overhead display device 340 to complete second section 328 of archway 300 between third EGM 306 and fourth EGM 308. In other embodiments, fifth overhead display device 338 may also include a curvature.

In addition, to suspend or mount overhead display devices 330-340, an external frame 346 may be provided. External frame 346 may attach to one or more EGMs, such as EGMs 302-308. In some embodiments, a plurality of such external frames may be provided and may attach to one or more EGMs 302-308 as well. In either case, each overhead display device 330-340 may be mechanically coupled to and supported in an overhead position by external frame 346. In other embodiments, one or more overhead display devices 330-340 may be suspended from a ceiling or overhead surface.

To couple overhead display devices 330-340, any of a variety of mounting brackets may be used. For instance, in at least one embodiment, mounting brackets having a first flange and a second flange spaced apart from the first flange by a small distance may be used to sandwich, clamp, or otherwise mechanically couple each overhead display device 330-340 to external frame 346. In at least one embodiment, these mounting brackets may include a "hamburger" shape. It will be appreciated, however, that any suitable mounting structure may be used to hang, mount, support, or otherwise couple display devices 330-340 to external frame 346.

For example, in yet another embodiment, overhead display devices 330-340 may be pressure-fit or snap-fit into an interlocking arrangement of overhead display devices 330-340. For instance, archway 300 may be configured to function in a manner similar to an arch bridge by transferring at least some of the weight of archway 300 and its loads (if any) at least partially into a horizontal thrust that is restrained at either side by one or more abutments, where the abutments in this case include EGMs 302-308. As a result, EGMs 302-308 may contribute to the support structure of archway 300 in a manner that eliminates or reduces the necessity of including a secondary load-bearing structure (e.g., external frame 346).

In some embodiments, archway 300 may include a plurality of side-mounted display devices (e.g., side-mounted LED panels). Although not shown in FIG. 3, side-mounted display devices may be included on one or more edges of archway 300, such as along a first edge 352 and/or along a second edge 354. As a result, in at least some embodiments, an edge 352 and/or 354 of archway 300 may also be configured to provide graphics. Similarly, in at least some embodiments, archway 300 may include additional display devices (e.g., LED panels) disposed between EGM pairs 302 and 306 and/or 304 and 308. Such additional display devices may extend further between first archway section 326 and second archway section 328.

In addition, although ring and tunnel shaped archways are primarily described herein, in various embodiments, any of a variety of shapes may be created using the materials, techniques, methods, and systems described herein. For example, in at least one embodiment, a T-shaped archway may be created. Likewise, in another embodiment, a plus-shaped, cross-shaped, and/or any other bisecting-shaped archway may be created. Further still, in at least some embodiments, a ring or tunnel shaped archway may be created to circle back on itself to form a tunnel or ring shaped archway in the shape of a circle or an oval (e.g., a tunnel that players may walk through by traveling in a circle or another concentric shape). In some embodiments, the archways may be substantially flat (e.g., rather than the arc shape primarily described herein). Accordingly, it will be appreciated that any of a variety of complex shapes and archway patterns may be created using systems and methods of the present disclosure.

In addition, in at least some embodiments, archway 300 may include one or more candles 138, as described herein. For example, a candle 138 may be mounted on the top of archway 300 and may be activated by a player (e.g., using a switch or one of buttons 122) to indicate to operations staff that an EGM 302-308 has experienced a malfunction or the player requires service. The candle 138 is also often used to indicate a jackpot has been won and to alert staff that a hand payout of an award may be needed.

Figure 5:
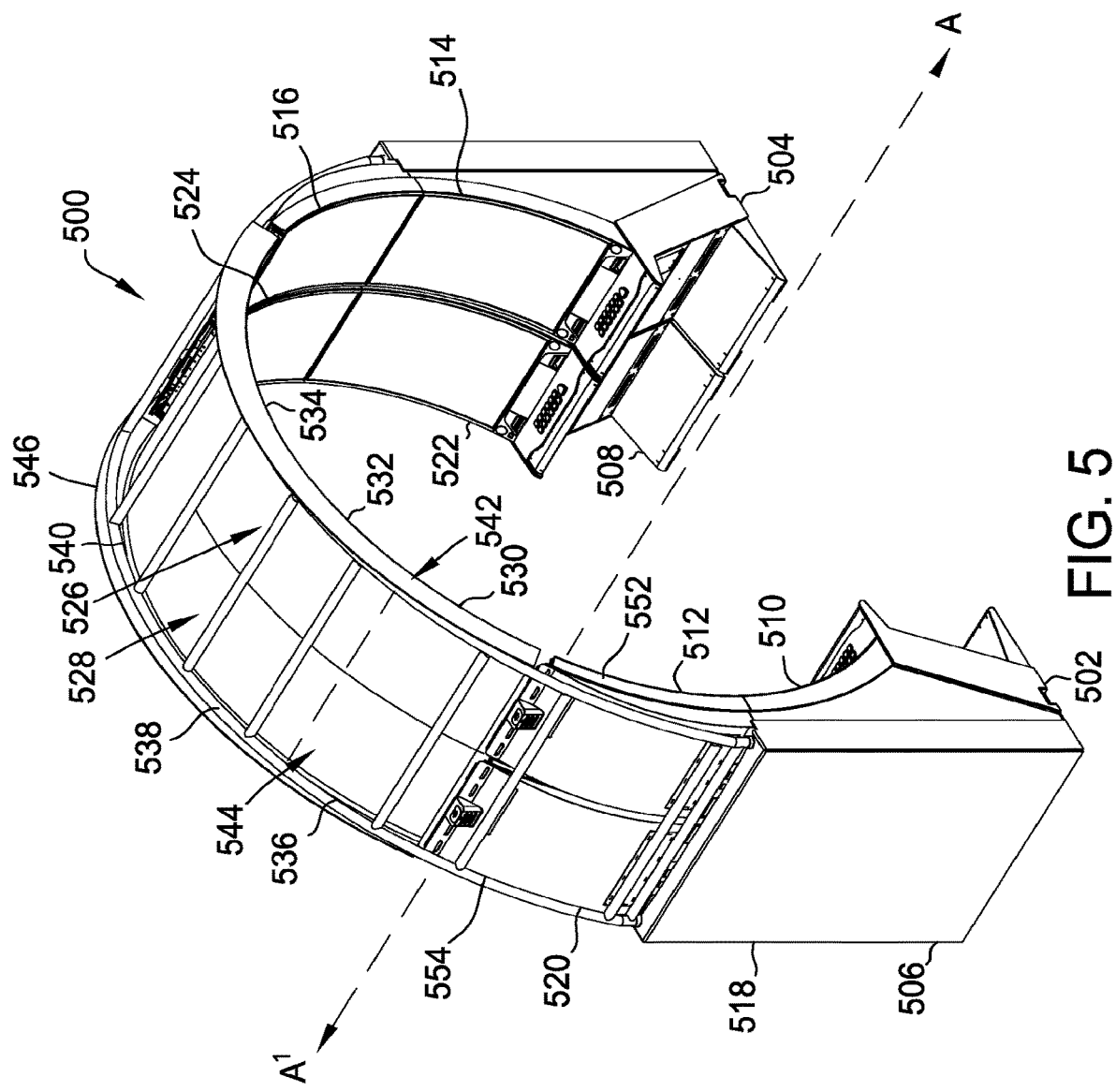
FIG. 5 is a perspective view of a second example embodiment of an EGM archway including a plurality of EGMs, as shown in FIG. 1 and FIG. 2.
Figure 6:
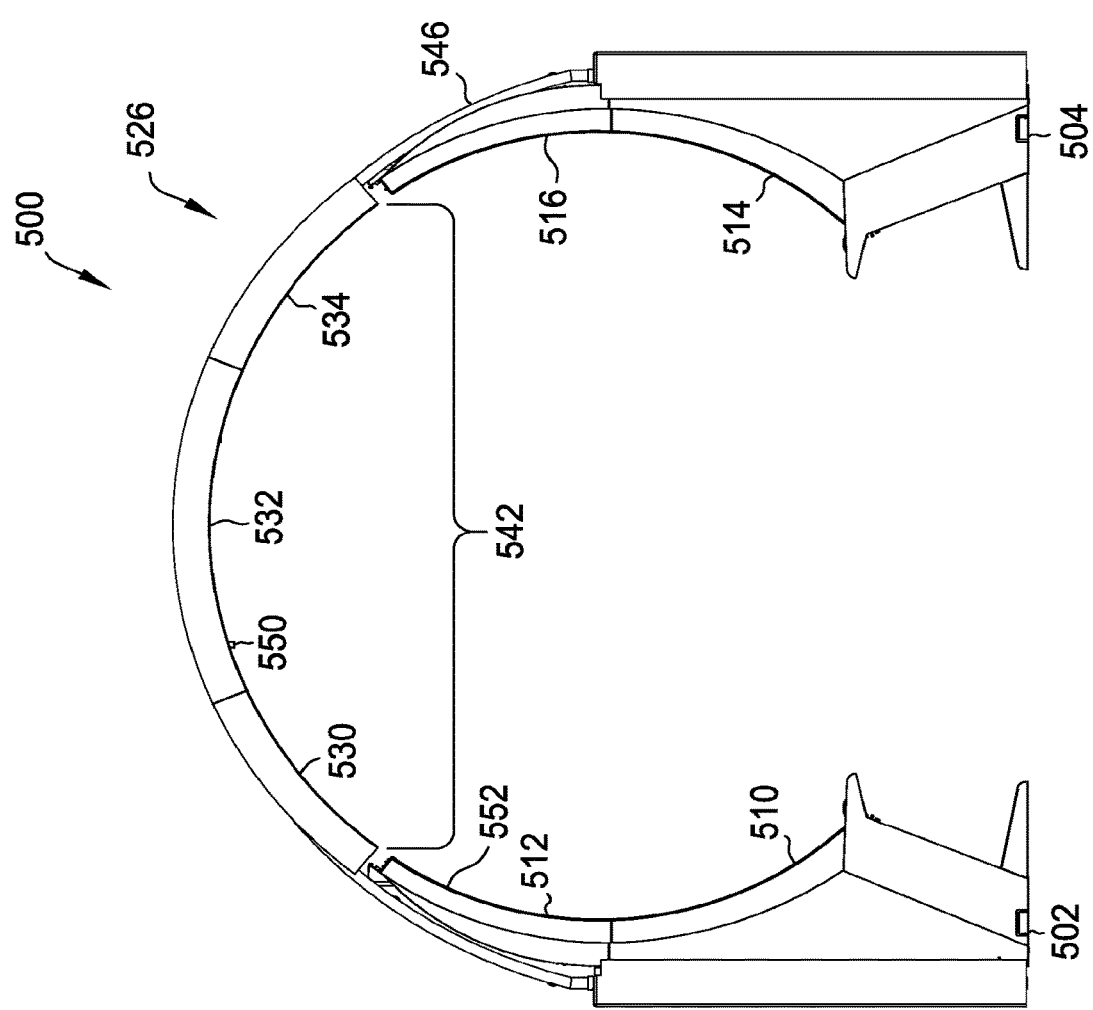
FIG. 6 is a side view of the second example embodiment of the EGM archway shown in FIG. 5.

FIG. 5 is a perspective view of a second example embodiment of an EGM archway 500. FIG. 6 is a side view of the second example embodiment of EGM archway 500. EGM archway 500 extends axially along a centerline A-A'.

As described in additional detail below, EGM archway 500 is substantially similar to EGM archway 300, except, for example, that all overhead portions of archway 500 are, in the second example embodiment, curved. In contrast, as described above, at least some overhead portions (or overhead display devices) of archway 300 are substantially planar.

Accordingly, in the second example embodiment, EGM archway 500 includes a first EGM 502, a second EGM 504, a third EGM 506, and a fourth EGM 508. As in the first example embodiment, in the second example embodiment, first EGM 302 includes at least a first curved display device 510 and a second curved display device 512. Second EGM 504 includes at least a first curved display device 514 and a second curved display device 516. Third EGM 506 includes at least a first curved display device 518 and a second curved display device 520. Fourth EGM 508 includes at least a first curved display device 522 and a second curved display device 524.

Although in this example embodiment, each EGM 502-508 includes two curved display devices (e.g., two curved display screens), in other embodiments, any other number of curved display devices may be included in any of EGMs 502-508. Further, curved display devices 510-524 may be the same as or different from curved display devices 310-324 of EGM archway 300 in the first example embodiment. Likewise, EGMs 502-508 may be the same as or different from EGMs 302-304.

First EGM 502 and second EGM 504 may together define opposing lower or non-overhead portions of a first archway section 526, and third EGM 506 and fourth EGM 508 may together define opposing lower or non-overhead portions of a second archway section 528. As shown, first archway section 526 and second archway section 528 may abut one another, such that EGM archway 500 is substantially continuous along axis A-A'.

In addition, it will be appreciated that any number of EGMs may be arranged along axis A-A' to create an archway 500 of any length along axis A-A'. For example, in some embodiments, archway 500 may include only a single pair of EGMs, such as EGMs 502 and 504, to define a ring-shaped archway. In another embodiment, archway 500 includes EGMs 502-508 to define a short tunnel-shaped archway (e.g., extending in a longitudinal direction) having two sections 526 and 528, and in yet another embodiment, archway 500 includes greater than four EGMs to define a longer tunnel-shaped archway having, for example, greater than two sections.

In addition to the portions of each archway section 526 and 528 defined by EGMs 502-508 (e.g., the lower or substantially non-overhead portions), in various embodiments, one or more display devices may be mechanically and/or electrically coupled between first EGM 502 and second EGM 504. Likewise, one or more display devices may be mechanically and/or electrically coupled between third EGM 506 and fourth EGM 508.

More particularly, in at least the second example embodiment, a first overhead display device 530, a second overhead display device 532, and a third overhead display device 534 may extend between first EGM 502 and second EGM 504. Similarly, a fourth overhead display device 536, a fifth overhead display device 538, and a sixth overhead display device 540 may extend between third EGM 506 and fourth EGM 508.

Overhead display devices 530-540 may include a variety of shapes and may be joined or coupled, as shown and described, between respective EGMs 502-508 to define overhead portions of archway 500. Specifically, first overhead display device 530, second overhead display device 532, and third overhead display device 534 may extend between first EGM 502 and second EGM 504 to define a first overhead portion 542. Similarly, fourth overhead display device 536, fifth overhead display device 538, and sixth overhead display device 540 may extend between third EGM 506 and fourth EGM 508 to define a second overhead portion 544.

As shown, in at least one embodiment, first overhead display device 530 includes a curvature and extends from an edge of second display device 512 of first EGM 502. Likewise, third overhead display device 534 includes a curvature and extends from an edge of second display device 516 of second EGM 504. Second overhead display device 532 also includes a curvature and extends overhead between first overhead display device 530 and third overhead display device 534 to complete first section 526 of archway 500 between first EGM 502 and second EGM 504.

Similarly, fourth overhead display device 536 includes a curvature and extends from an edge of second display device 520 of third EGM 506. Likewise, sixth overhead display device 540 includes a curvature and extends from an edge of second display device 524 of fourth EGM 508. Fifth overhead display device 538 also includes a curvature and extends overhead between fourth overhead display device 536 and sixth overhead display device 540 to complete second section 528 of archway 500 between third EGM 506 and fourth EGM 508.

In addition, to suspend or mount overhead display devices 530-540, an external frame 546 may be provided. External frame 546 may attach to one or more EGMs, such as EGMs 502-508. In some embodiments, a plurality of such external frames may be provided and may attached to one or more EGMs 502-508 as well. In either case, each overhead display device 530-540 may be mechanically coupled to and supported in an overhead position by external frame 546. In other embodiments, one or more overhead display devices 530-540 may be suspended from a ceiling or overhead surface.

Further, as described above, overhead display devices 530-540 may be mechanically coupled to external frame 546 using any of a variety of mounting brackets, such as mounting brackets having a first flange and a second flange spaced apart from the first flange by a small distance. These brackets, which may in at least some cases be referred to as "hamburger" brackets, may be used to sandwich, clamp, or otherwise mechanically couple each overhead display device 530-540 to external frame 546. It will be appreciated, however, that any suitable mounting structure may be used to hang, mount, support, or otherwise couple display devices 530-540 to external frame 546.

In yet another embodiment, and as described in additional detail above, overhead display devices 530-540 may be pressure-fit or snap-fit into an interlocking arrangement of overhead display devices 530-540. For example, archway 500 may be configured to function in a manner similar to an arch bridge by transferring at least some of the weight of archway 500 and its loads (if any) at least partially into a horizontal thrust that is restrained at either side by one or more abutments, where the abutments in this case include EGMs 502-508.

In some embodiments, archway 500 may include a plurality of side-mounted display devices (e.g., LED panels). Although not shown in FIG. 5, side-mounted display devices may be included on one or more edges of archway 500, such as along a first edge 552 and/or along a second edge 554. As a result, in at least some embodiments, an edge 552 and/or 554 of archway 500 may also be configured to provide graphics. Similarly, as described above, archway 500 may also include a plurality of display devices (e.g., LED panels) extending between "tunnel sections," such as between first archway section 526 and second archway section 528.

In addition to the embodiments described above, display devices (curved and planar) may be added in a variety of other embodiments to achieve substantially similar effects. For example, in at least one embodiment, one or more display devices may be added in a different or rotated orientation (e.g., a "landscape" orientation), whereby one or more display devices are rotated or positioned in a same or different plane at one or more angles (e.g., such as in a same plane by 180 degrees) to the display devices 330-340 and 530-340 described above). In another embodiment, smaller or larger display devices may be implemented, whereby greater or fewer display devices may be used to create either of archway 300 or archway 500.

In some embodiments, display devices may, in addition, be added to a floor surface of either archway 300 or 500, whereby a fully immersive "tunnel" or other curving display enclosure may be created. In these embodiments, display devices making up a walking surface may be coated with or installed under a protective layer (e.g., a layer of plastic or durable glass) to permit walking on or overtop these surface display devices.

During operation, data, such as images and video may be displayed on any of the EGMs 302-308 and 502-508 described herein. Likewise, images and video may be displayed on any of the display devices extending between these EGMs 302-308 and 502-508, such as any of overhead display devices 330-340 and 530-540.

As a result, images and video may be controlled to flow in any desired manner, such as between EGMs 302-308 and 502-508 over or along the display devices of either archway 300 and/or 500. In one example, a player of one EGM, such as EGM 302, may receive a winning game outcome. In response, a celebration graphic may be displayed for the player on his or her EGM 302. The same celebration graphic (or a related celebration graphic) may also be provided overhead within archway 300 for viewing by other players and/or casino patrons walking through archway 300.

Likewise, in at least some embodiments, in response to the player of EGM 302 receiving the winning game outcome, one or more bonus awards may flow or otherwise travel (e.g., as lightning bolts or as dragons carrying bonus eggs) across archway 300 and be deposited (e.g., as lightning strikes or dragons dropping the bonus eggs) on one or more other EGMs 304-308 within archway 300. In some example embodiments, one or more displays of archways 300 and 500 may display "attract mode" graphics (e.g., graphics intended to attract bystanders or other players) when no bonus feature is displayed by the archways 300 and 500.

These are only a few examples and are only intended to illustrate several possibilities which may be available and/or implemented using archways 300 and 500. More generally, it will be appreciated that any of a variety of flowing graphics and animations may be provided within and on the display devices of archways 300 and 500, and that the scope of the present disclosure is not limited to the several examples provided herein.

In addition, and in various embodiments, archways 300 and/or 500 may include one or more security cameras. For example, archway 300 may include a security camera 350, and archway 500 may include a security camera 550. Security cameras 350 and 550 may, as shown, be positioned on an inner surface of each archway 300 and/or 500, which may allow security cameras 350 and 550 to look down on activity occurring within archways 300 and 500. This feature may facilitate observation (e.g., surveillance) of activities occurring within archways 300 and 500, which may otherwise be obscured from observation by standard ceiling-mounted casino camera systems.

Cameras 350 and 550 may, in addition, be networked with and communicatively coupled to standard casino security and monitoring systems, such as via any suitable wireless and/or wired connection. In one embodiment, cameras 350 and 550 are wirelessly connected to a casino security system via a BLUETOOTH or WIFI data communication protocol and/or system. However, it will be appreciated that any suitable communication system may be implemented. For instance, in at least some embodiments (e.g., if additional data security is desired), cameras 350 and 550 may be hardwired into the casino network through one or more of the EGMs making up the respective archway 300 and/or 500.

Moreover, in at least some embodiments, one or more audio output devices (e.g., speakers) may be incorporated in an archway 300 and/or 500. For example, in some embodiments, surround sound speakers may be incorporated in archways 300 and 500 to provide rich-sounding audio within archways 300 and 500. In some embodiments, speakers may be directionally oriented within an archway 300 or 500 to provide enhanced or amplified sound within the archway 300 or 500. For example, in at least one embodiment, speakers may be positioned within an archway 300 or 500 to provide a longitudinally traveling soundwave within the archway 300 or 500, whereby persons within the archway 300 or 500 may experience a "wave of sound" that can be felt physically, such as, in the form of an air pressure wave traveling within the tunnel formed by the archways 300 or 500. Archways 300 and 500 may, in these aspects, function similar to megaphones or other sound-amplification shapes/structures.

Figure 7:
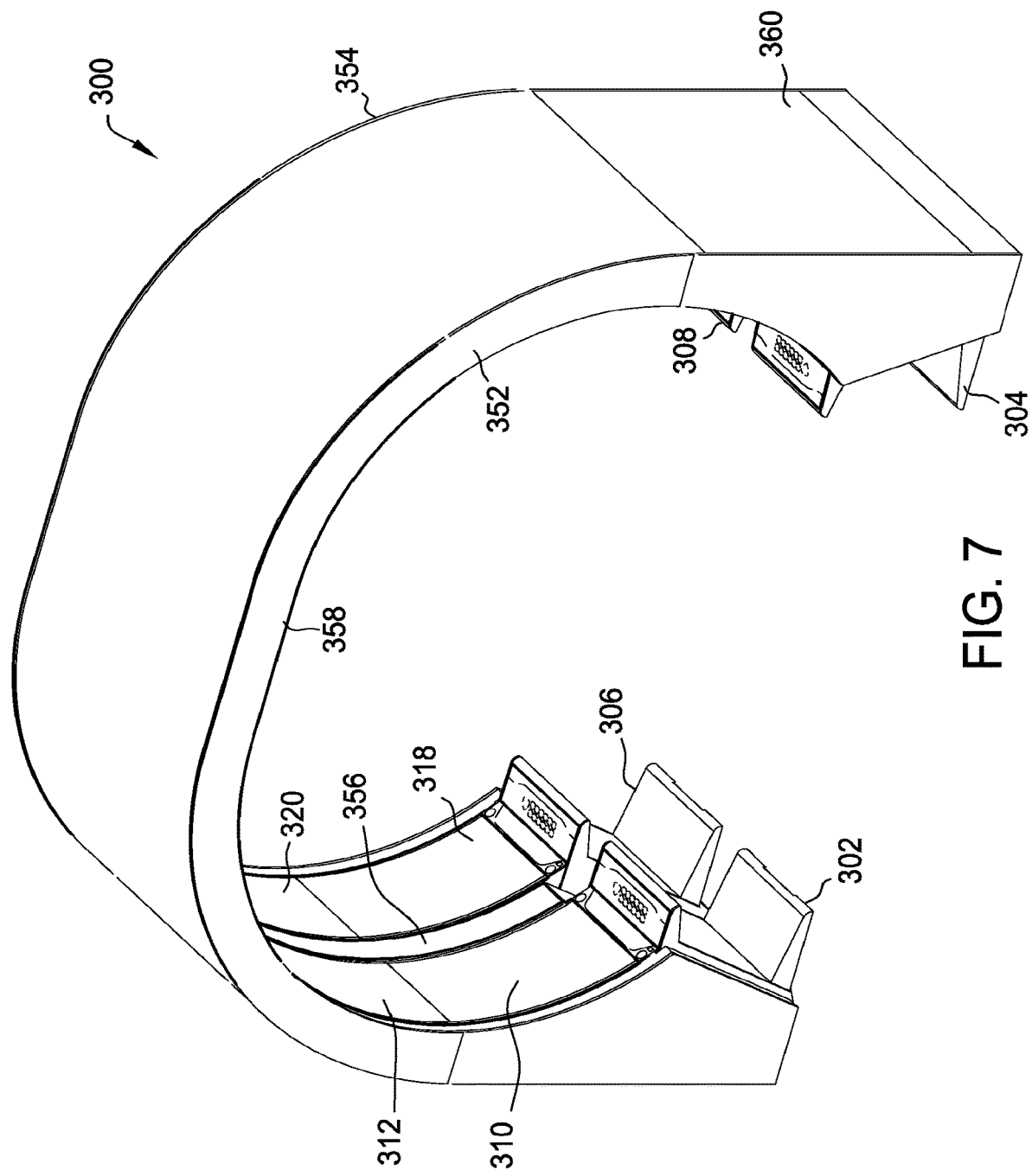
FIG. 7 is a perspective view of a third example embodiment of an EGM archway including a plurality of EGMs, as shown in FIG. 1 and FIG. 2.
Figure 8:
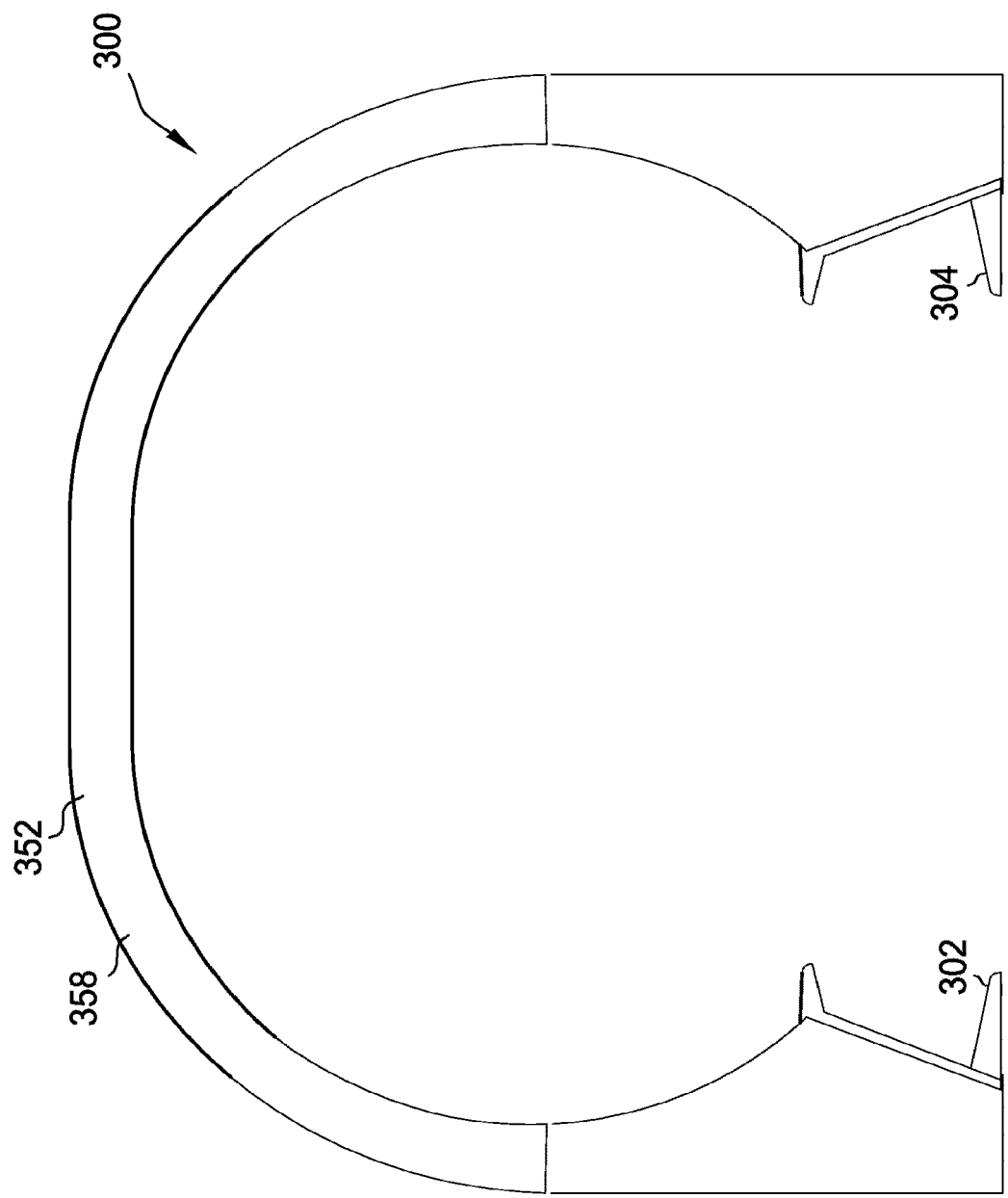
FIG. 8 is a side view of the third example embodiment of the EGM archway shown in FIG. 7.
Figure 9:
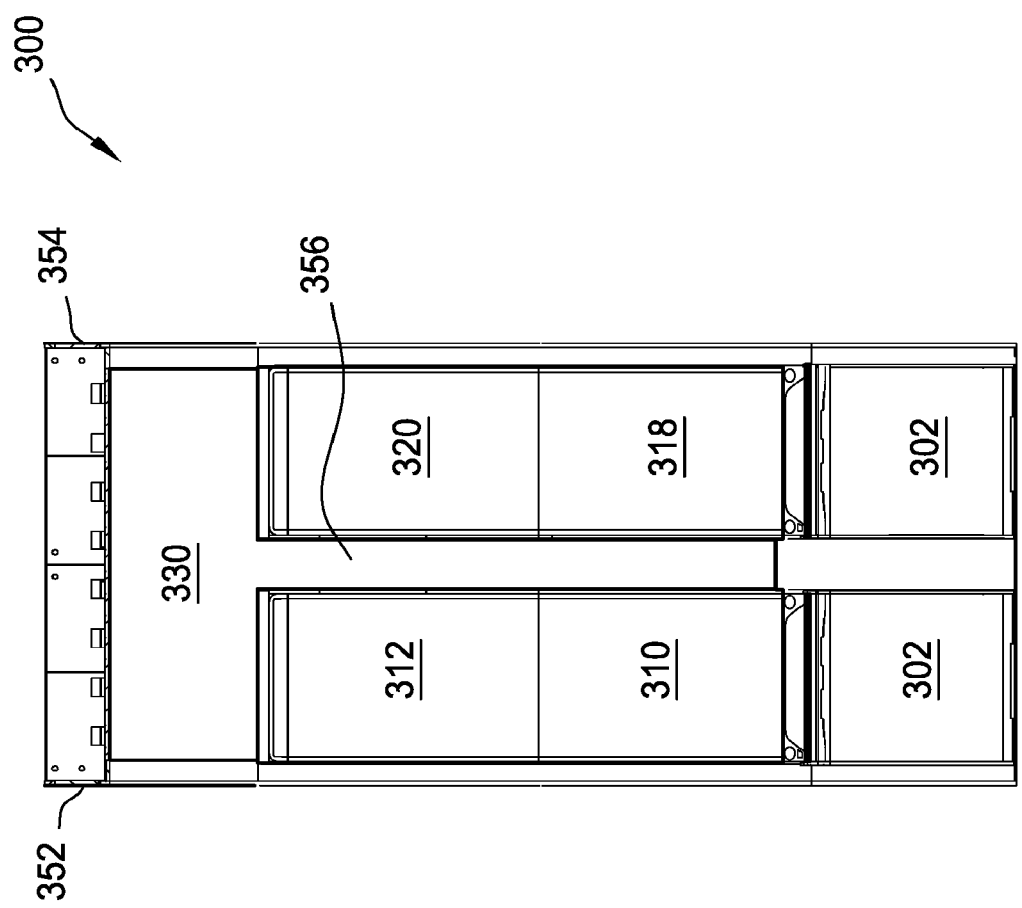
FIG. 9 is an interior view, taken along the cross-section 9-9', of the third example embodiment of the EGM archway shown in FIG. 7 and FIG. 8.

FIG. 7 is a perspective view of a third example embodiment of archway 300, as shown in FIG. 3. Likewise, FIG. 8 is a side view of the third example embodiment of EGM archway 300. In addition, FIG. 9 is an interior view, taken along the cross-section 9-9', of the third example embodiment of EGM archway 300 (see FIG. 8). In addition, FIG. 12-FIG. 29 show different views of the third example embodiment of EGM archway 300, as shown and described primarily with reference to FIG. 7-FIG. 10.

Accordingly, as described above, in the third example embodiment, EGM archway 300 includes the first EGM 302, the second EGM 304, the third EGM 306, and the fourth EGM 308. In general, EGMs 302-308 may include any suitable electronic gaming machine or gaming device, such as any of EGMs 104A-104X, as described herein. EGMs 302-308 may also include any of the computer architecture shown in FIG. 2 (with reference to gaming device or EGM 200).

As described herein, each EGM 302-308 may include one or more curved display devices. For example, in at least some embodiments, first EGM 302 includes at least a first curved display device 310 and a second curved display device 312, second EGM 304 includes at least a first curved display device 314 and a second curved display device 316, third EGM 306 includes at least a first curved display device 318 and a second curved display device 320, and fourth EGM 308 includes at least a first curved display device 322 and a second curved display device 324. Although in this example embodiment, each EGM 302-308 includes two curved display devices (e.g., two curved display screens), in other embodiments, any other number of curved display devices may be included in any of EGMs 302-308.

In addition, in at least the third example embodiment, an intermediate display device (or spacer display device) 356 may extend (e.g., latitudinally) between first EGM 302 and adjacent third EGM 306, such as, to define an intermediate display face. Similarly, another spacer display device (not shown) may extend between second EGM 304 and the fourth EGM 308. In various embodiments, spacer display device 356 may include any suitable display device and/or any of a plurality of display devices, such as any of a plurality of LED panels, any OLED panels, and/or any other suitable display element or device.

In some embodiments, spacer display device 356 may also be included between first archway section 326 and second archway section 328, such that spacer display device 356 spans substantially the entire curvature of archway 300 (e.g., down to about the level of an EGM button deck). In some embodiments, spacer display device 356 is curved to match the curve of first curved display device 310, a second curved display device 312, first curved display device 318, and second curved display device 320.

Accordingly, in some embodiments, spacer display device 356 extends from the first overhead display device 330 down to about a level of an EGM button deck and/or, in at least some cases, to a greater or lesser level. In some further embodiments, spacer display device 356 is a part of one or more overhead display devices 330-340 (e.g., first overhead display device 330) and extends, as described herein, at least partially between first archway section 326 and second archway section 328. In other embodiments, spacer display device 356 is in contact with or in communication with an overhead display device 330-340 (e.g., first overhead display device 330), such that objects displayed on first overhead display device 330 may travel to spacer display device 356, and vice versa. In these embodiments, another spacer display device extends from, is in contact with, or is in communication with third overhead display device 334 (shown in FIG. 3).

In some embodiments, archway 300 may include a plurality of side-mounted display devices 358. Side-mounted display devices 358 may be included on one or more edges of archway 300, such as along a first edge 352 and/or along a second edge 354. As a result, in at least some embodiments, an edge 352 and/or 354 of archway 300 may also be configured to provide graphics.

In at least some embodiments, archway 300 and/or overhead display portions 342 and/or 344 may include one or more display faces to define one or more edges, such as edges 352 and 354. For example, first overhead display portion 342 may include a first display face that includes or is defined by at least one display device, such as display devices 330-334. At least one additional display face may extend substantially orthogonally away from the first display face to define edge 352 of overhead display portion 342. Likewise, an additional display face may extend substantially orthogonally away from a display face of second overhead display portion 344 that includes overhead display devices 336-340 to define edge 354.

In some embodiments, archway 300 may include one or more back doors (or access doors) 360 to allow access to the back of EGMs 302-308. Back doors 360 may be fastened to the archway 300 using a variety of fastening mechanisms, including, but not limited to, bolts, screws, locking bolts, and magnets. Furthermore, the back doors 360 may include one or more detection mechanisms for detected when the back doors 360 are opened to prevent unauthorized access.

In some embodiment, the back doors 360 are configured to allow for EGMs 302-308 to be removed from archway 300, such as for replacing a defective EGM 302-308, swapping an EGM 302-308 with another model, and the like. Furthermore, each EGM 302-308 may slide in and out of the archway 300, such as on a wheeled or rolling carriage and/or using any other suitable sliding or rolling mechanism. For example, in some embodiments, archway 300 includes a series of rails or other guiding mechanisms to position the newly installed EGM. The EGM may then be mechanically, electrically, and/or communicatively connected to archway 300 (and/or any other casino system, server, or network) to allow for communication and interoperation with archway 300.

In some embodiments, each EGM 302-308 may communicate with archway 300 using one or more Ethernet or HDMI cables. These connections may allow the EGMs 302-308 to sync up with each other and to control archway 300. In some embodiments, EGMs 302-308 may control each display device or archway 300 (e.g., overhead display devices 330-340) individually and/or in groups by dividing up or otherwise assigning control over various display devices 330-340 to one or more EGMs 302-308. In other embodiments, EGMs 302-308 may control display devices 330-340 of archway 300 as a single display. In still further embodiments, one of the EGMs 302-308 may control the archway 300 and its corresponding display devices 330-340.

In yet another embodiment, a main processor or controller (or a plurality of such processors/controllers) may control overhead display devices 330-340 over archway 300. Likewise, the main processor may control display devices 310-324 of EGMs 302-308. For example, during a bonus round, display devices 310-324 of EGMs 302-308 and display devices 330-340 of archway 300 may be controlled by the main processor or controller to provide a seamless animation that travels between one or more displays 310-324 and 330-340, whereby the graphic may appear to travel between EGMs 302-308 and/or over or across archway 300.

In some embodiments, multiple archways 300 may be positioned adjacent to each other to create a longer tunnel or tunnel-shaped archway. Each archway 300 may be in mechanical, electrical, and/or network communication with one or more other archways 300, so that the display devices of each archway 300 are coordinated.

In some embodiments, the connected adjacent archways 300 are coordinated to allow continuous display over the adjacent display devices. For example, depicted objects, such as fireworks or birds may traverse the length of the tunnel, being displayed on multiple archways 300.

Such an embodiment is shown with reference to FIG. 30-FIG. 38, which show different views of a fifth example embodiment of an EGM archway including a plurality of EGMs arranged in a tunnel shape or arranged to form a tunnel within which players may walk to enjoy a variety of longitudinally and/or latitudinally traveling graphics. It will be appreciated that tunnel-shaped archways may include any suitable number of EGMs and overhead display portions to create tunnels of any desired length (e.g., ranging from just a few meters to tens of meters or even further).

Figure 10:
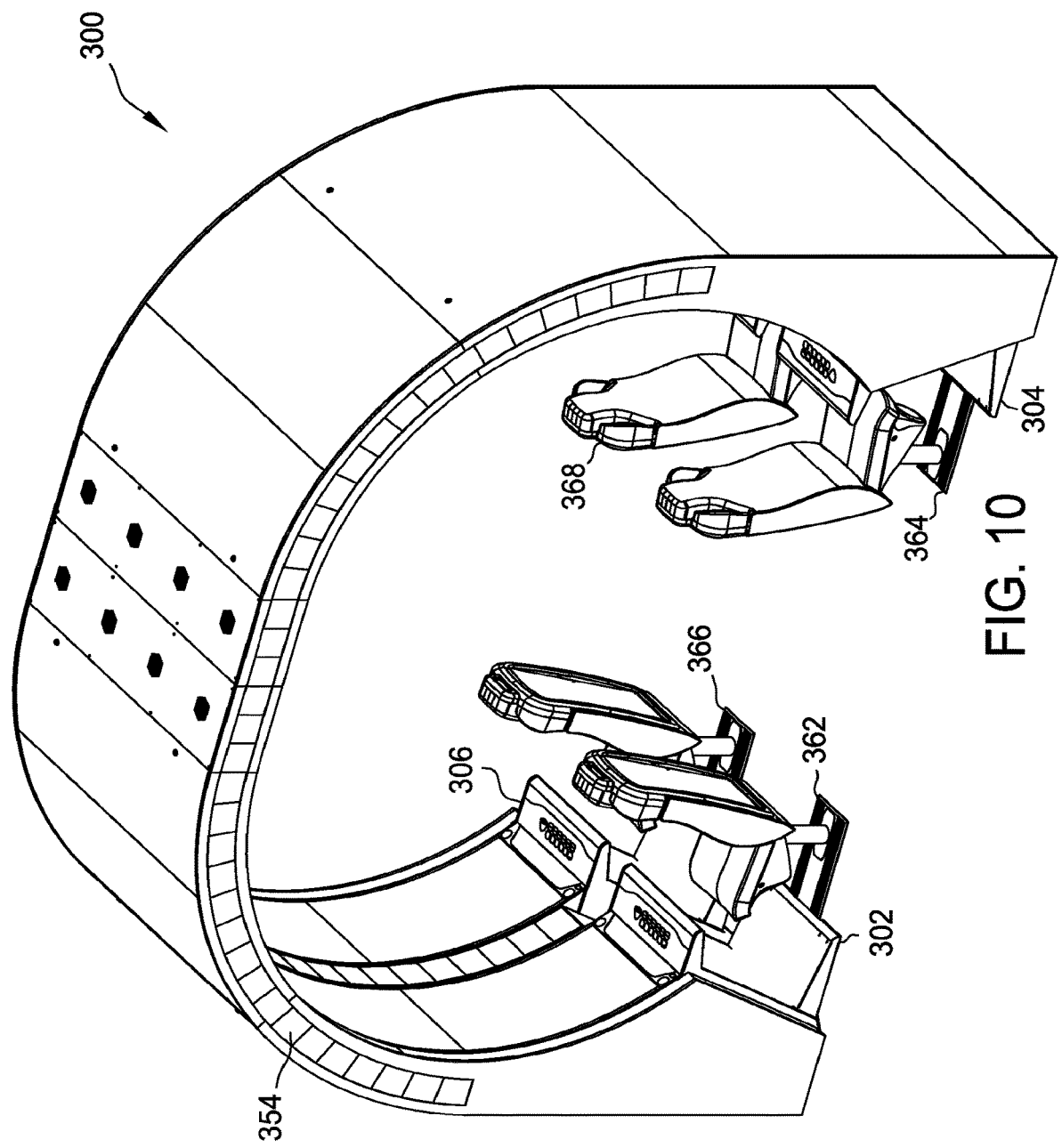
FIG. 10 is a perspective view of the third example embodiment of the EGM archway shown in FIG. 7, including a plurality of integrated chairs.

FIG. 10 is a perspective view of the third example embodiment of the EGM archway 300 shown in FIG. 7. As described herein, archway 300 includes the first EGM 302, the second EGM 304, the third EGM 306, and the fourth EGM 308. In the illustration of FIG. 10, first EGM 302 is associated with a first chair 362, second EGM 304 is associated with a second chair 364, third EGM 306 is associated with a third chair 366, and fourth EGM 308 is associated with a fourth chair 368. It will be appreciated that chairs, such as chairs 362-368 may be supplied with any of the embodiments described herein.

In some embodiments, each chair 362-368 includes one or more output devices, such as, but not limited to, haptic feedback devices and speakers. In these embodiments, the output devices are controlled by one of the corresponding EGM 302-308 and the archway 300. In other embodiments, a main processor or controller (as described herein) may also control the output devices of one or more chairs 362-368. In some embodiments, the chair 362-368 is attached to the corresponding EGM 302-308. In other embodiments, the chair 362-368 is attached to the archway 300, such that if an EGM 302-308 is removed (as described herein), then the corresponding chair 362-368 remains attached to or otherwise proximate archway 300.

Figure 11:
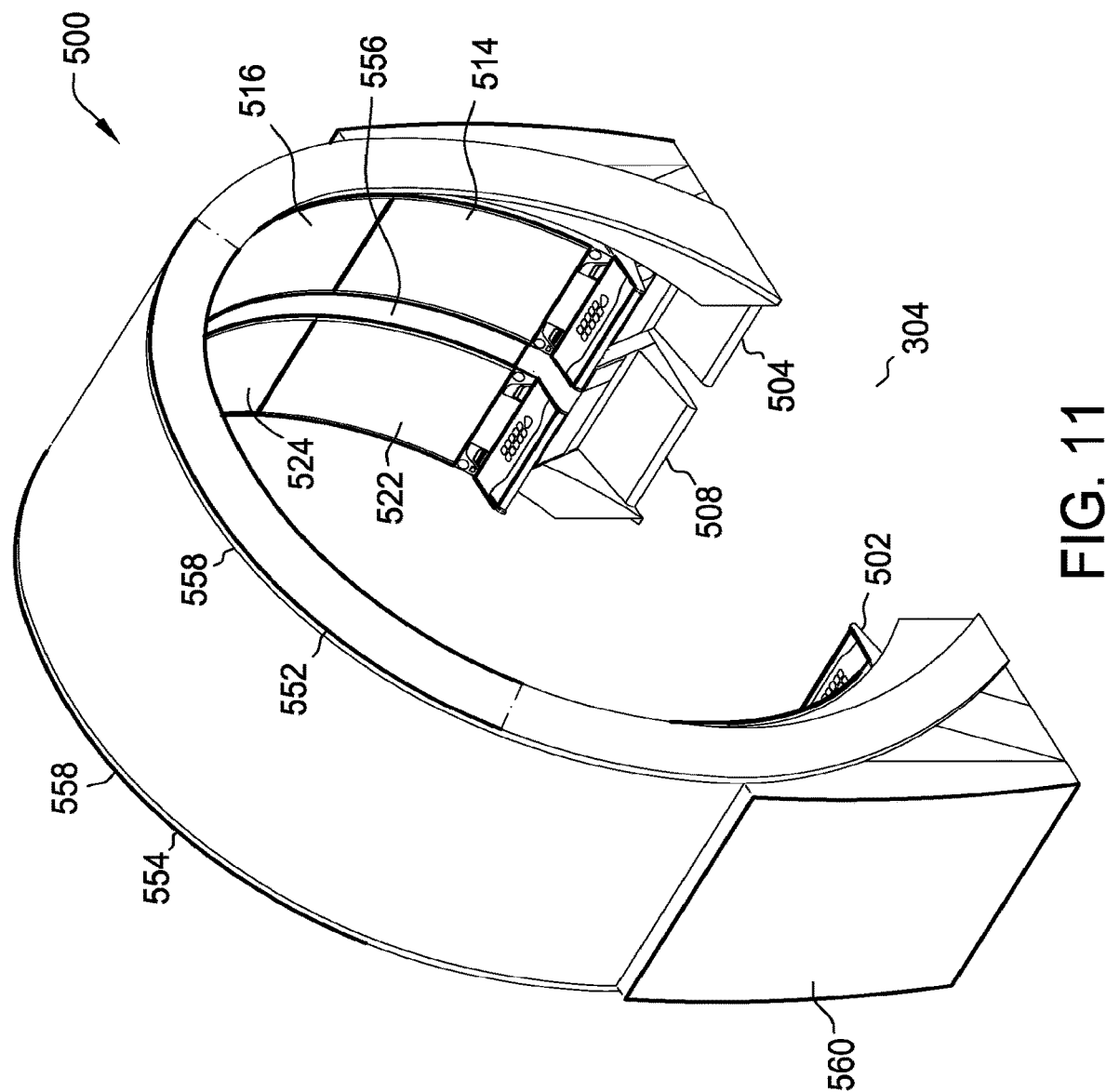
FIG. 11 is a perspective view of a fourth example embodiment of an EGM archway including a plurality of EGMs, as shown in FIG. 1 and FIG. 2.
Figure 12:
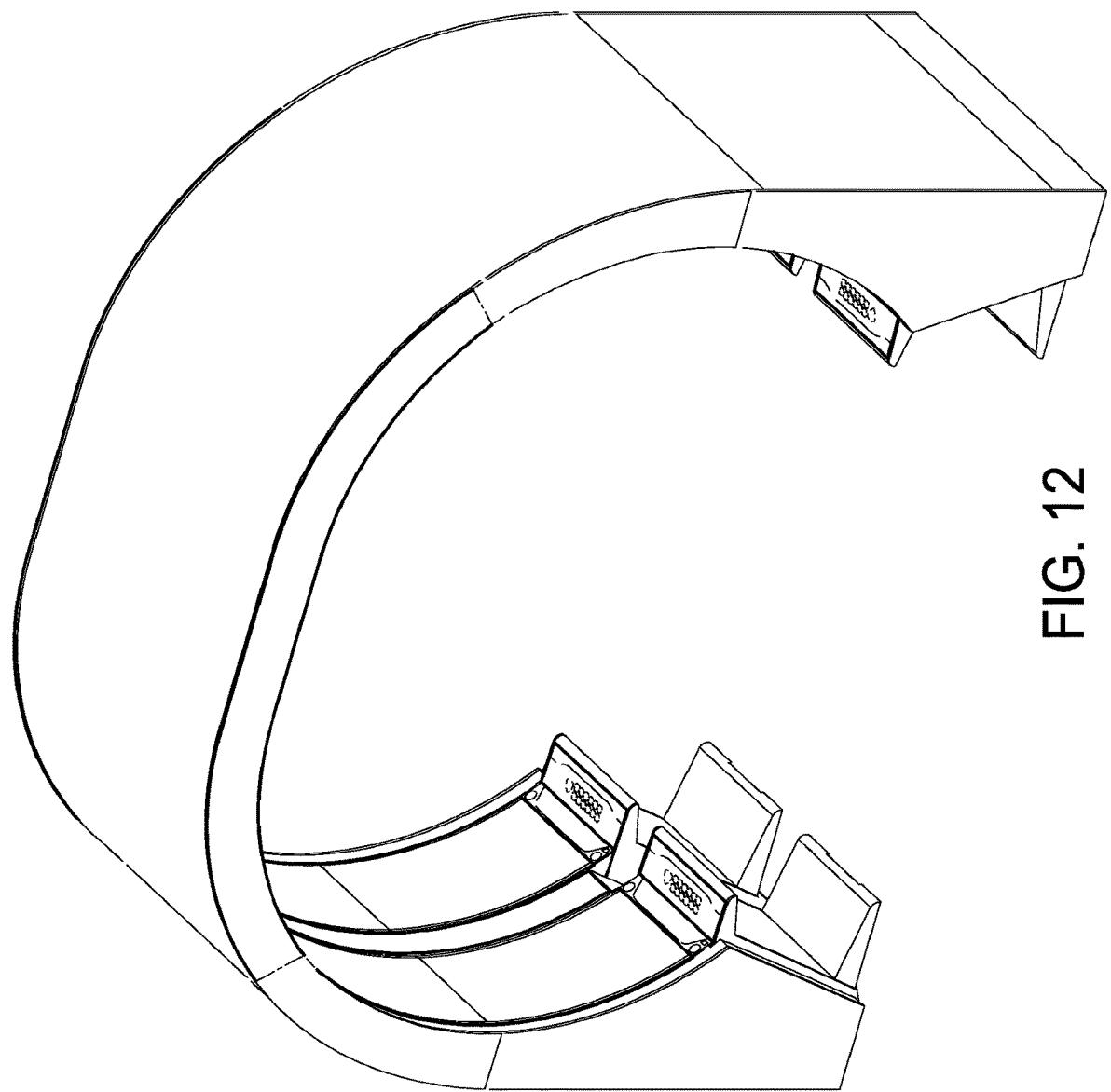
FIG. 12-FIG. 29 show different views of the third example embodiment of the EGM archway shown and described with reference to FIG. 7-FIG. 10.
Figure 13:
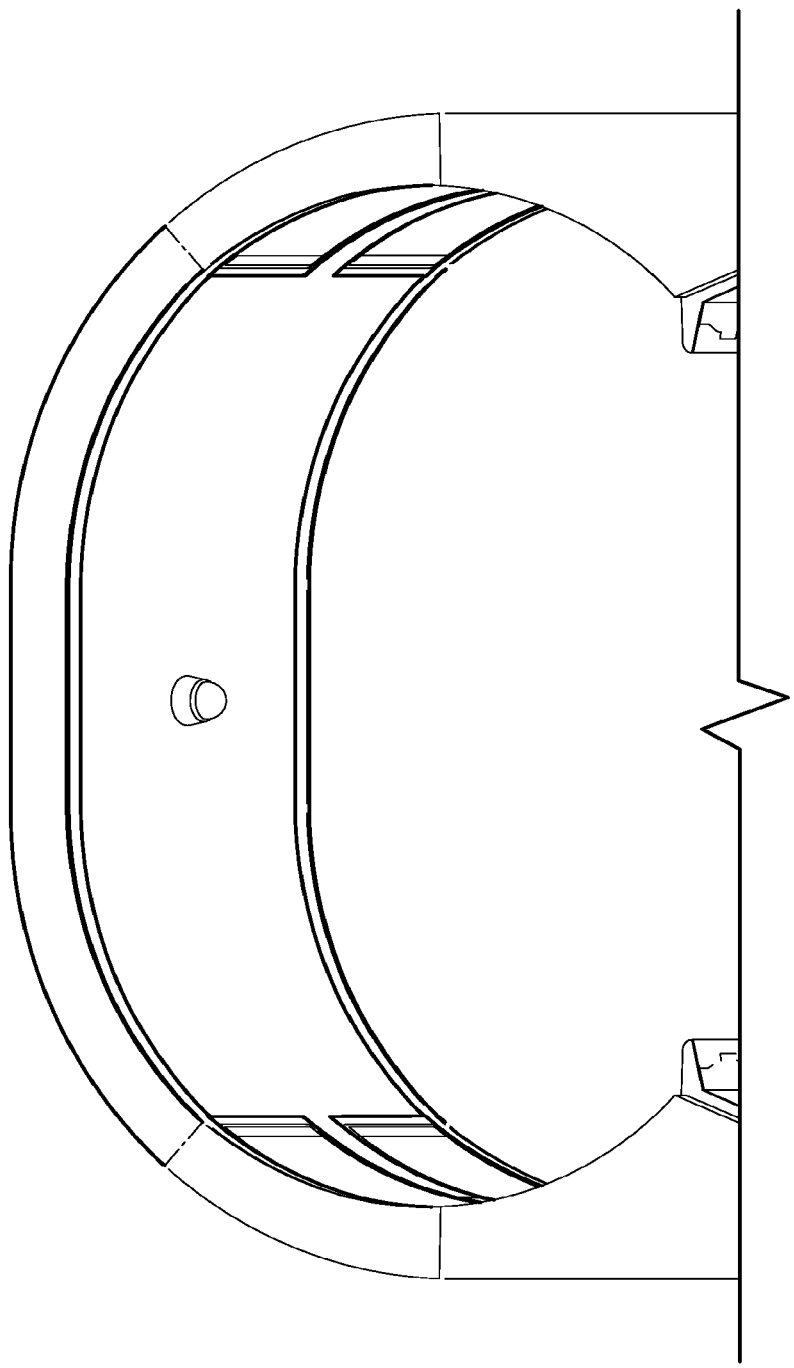
Figure 14:
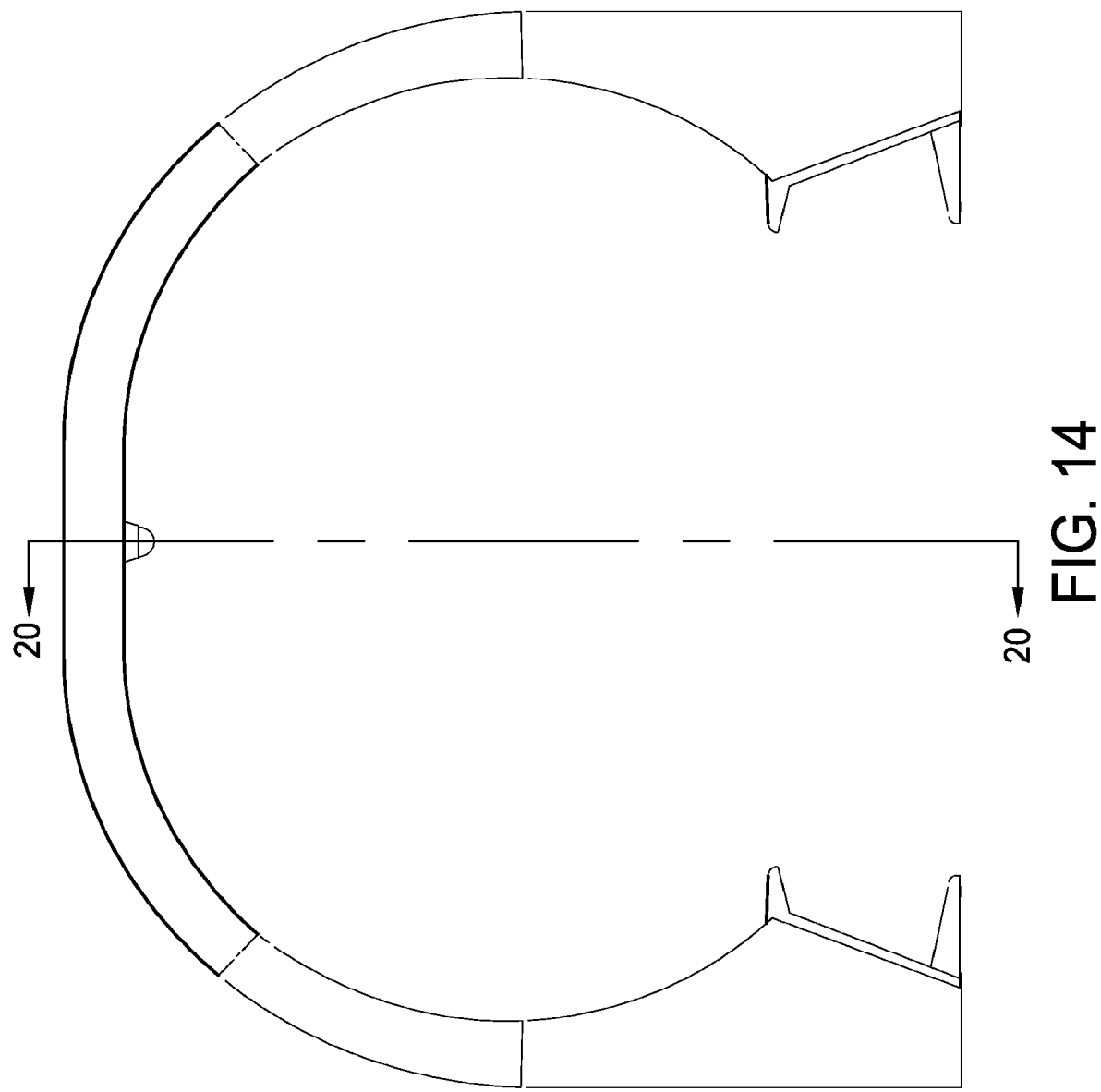
Figure 15:
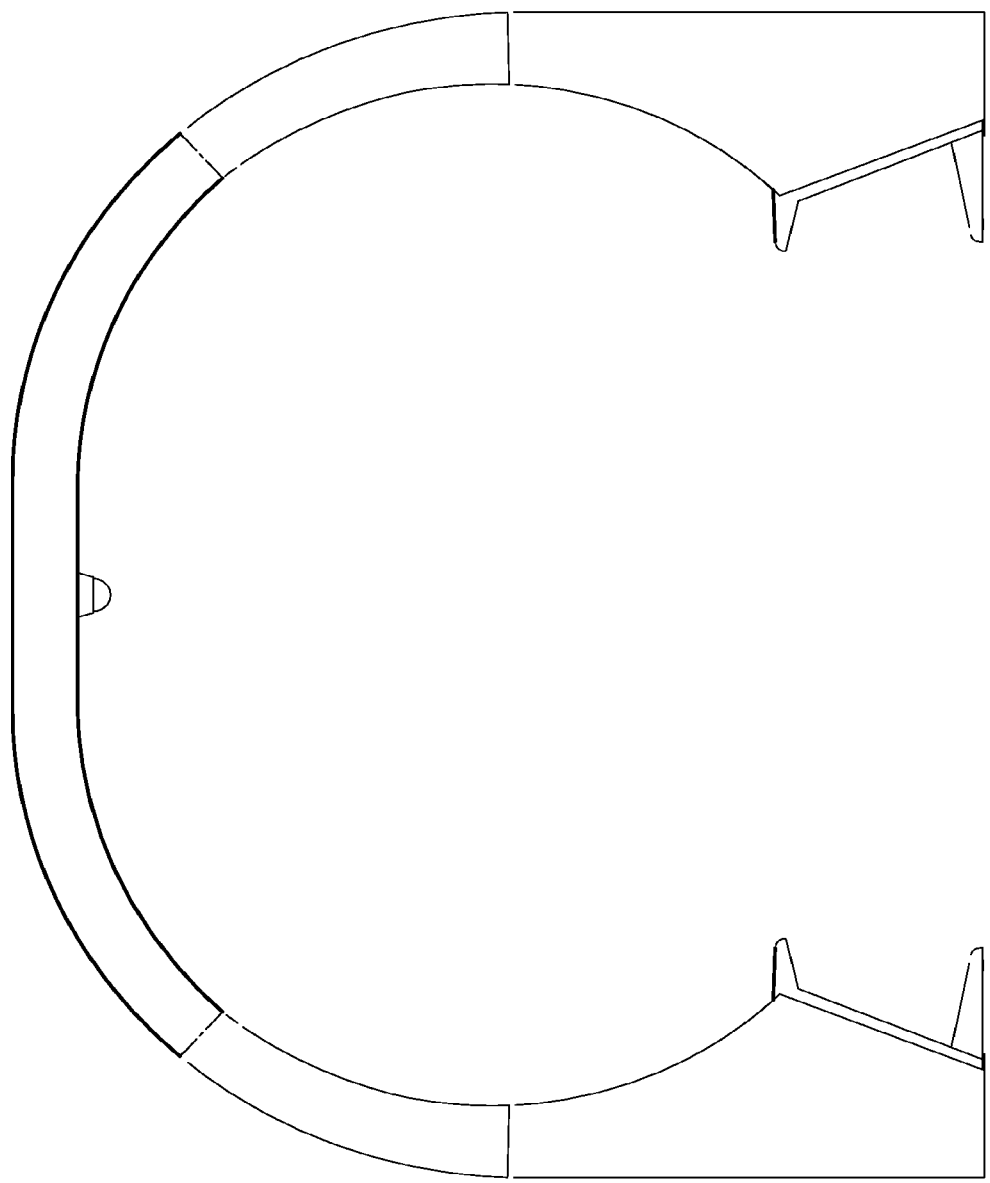
Figure 17:
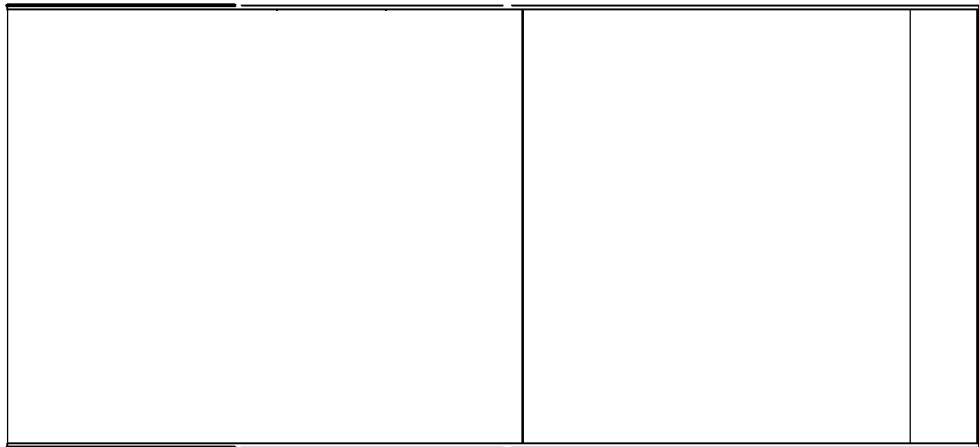
Figure 16:
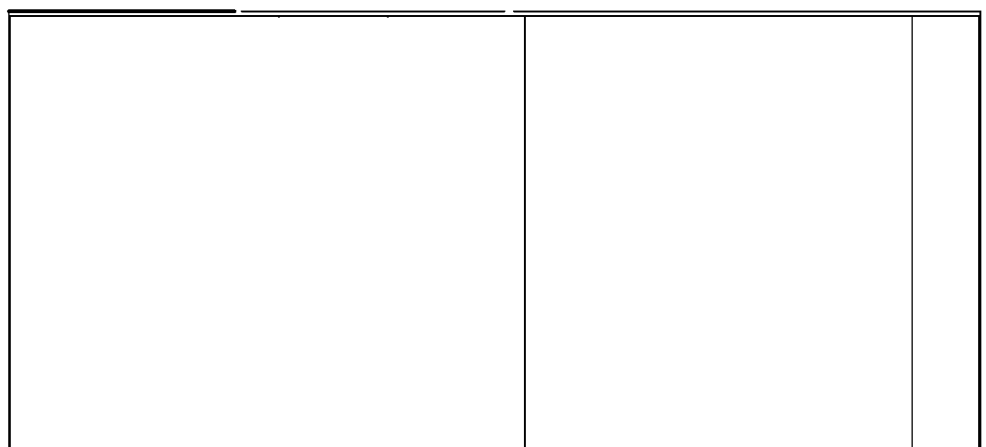
Figure 18:
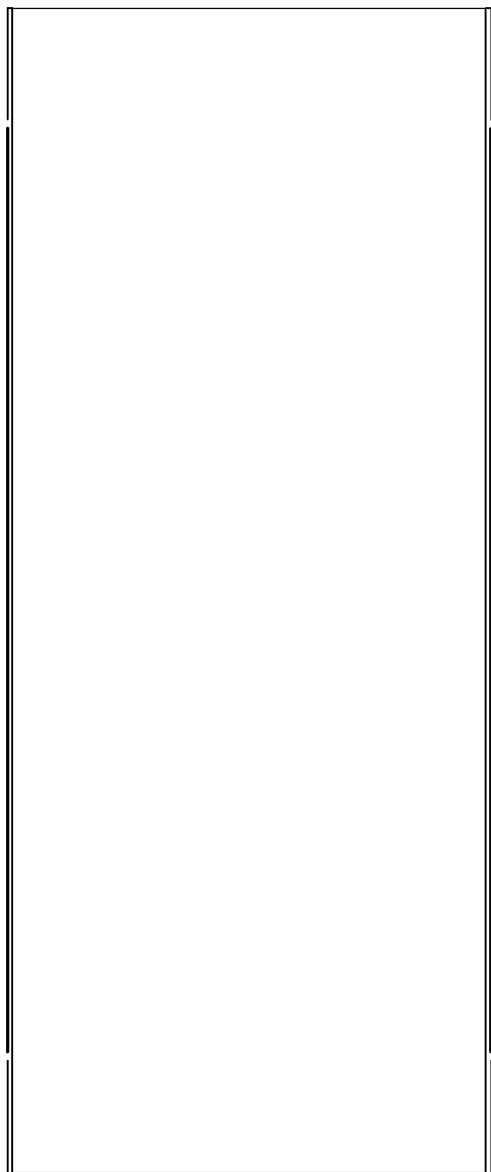
Figure 19:
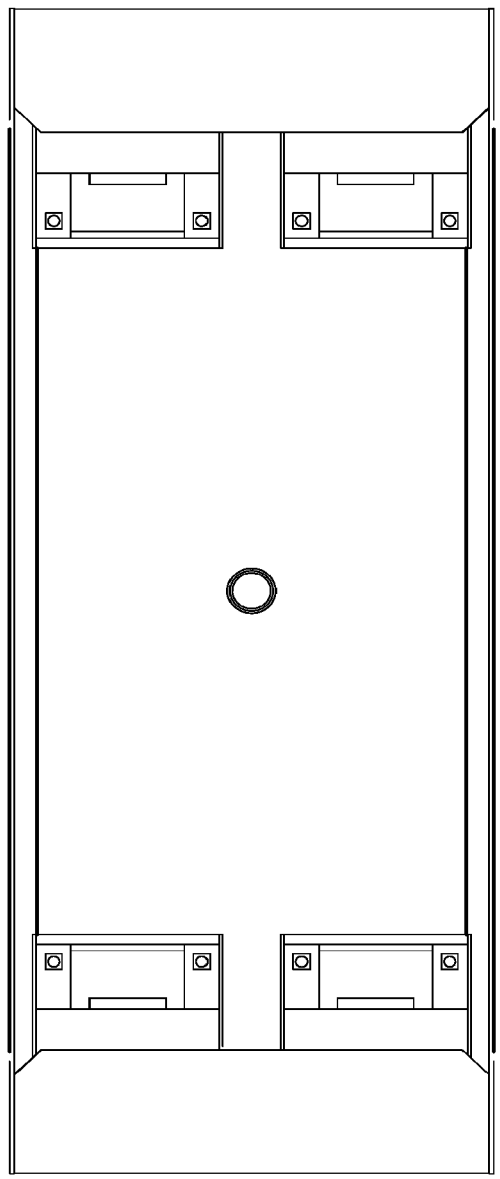
Figure 20:
Figure 21:
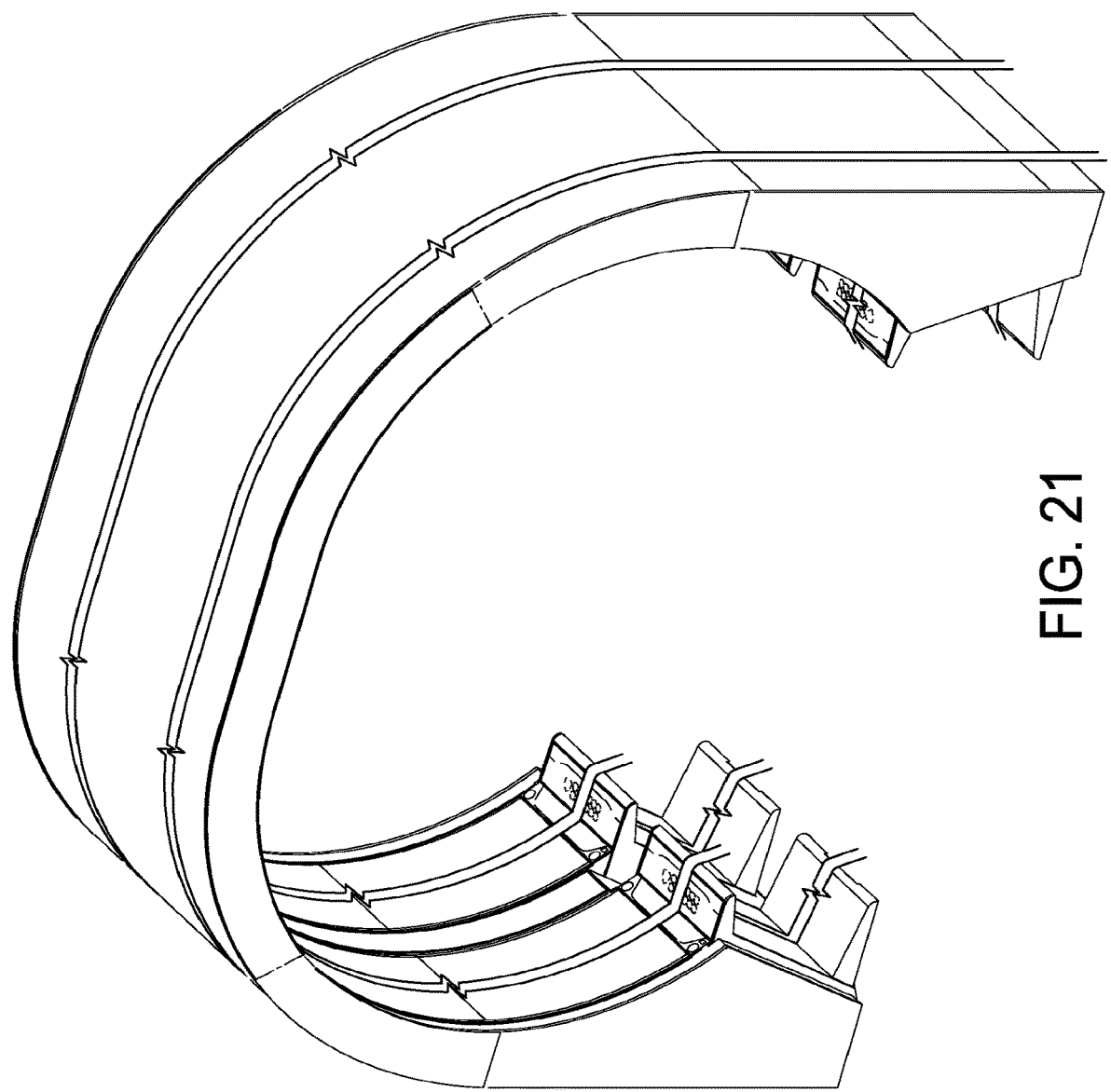
Figure 22:
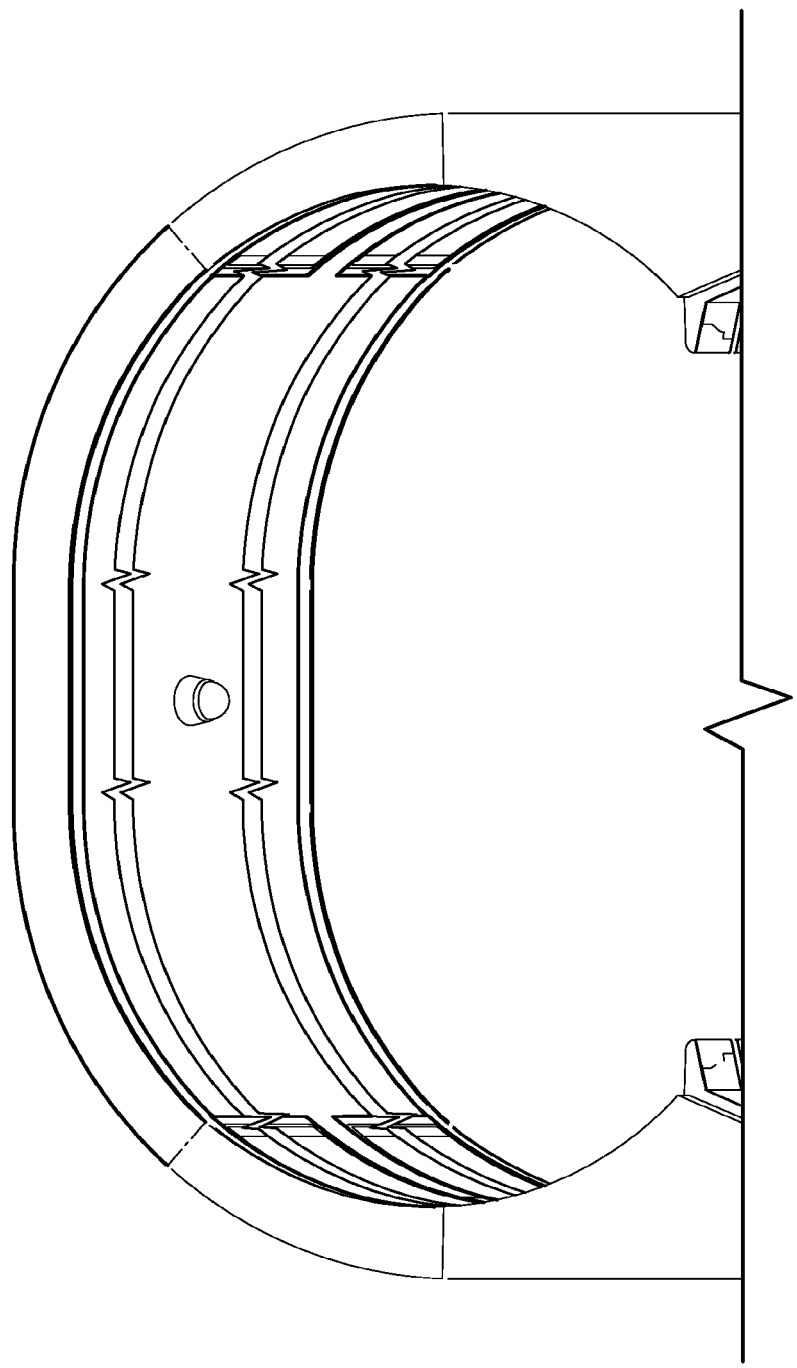
Figure 23:
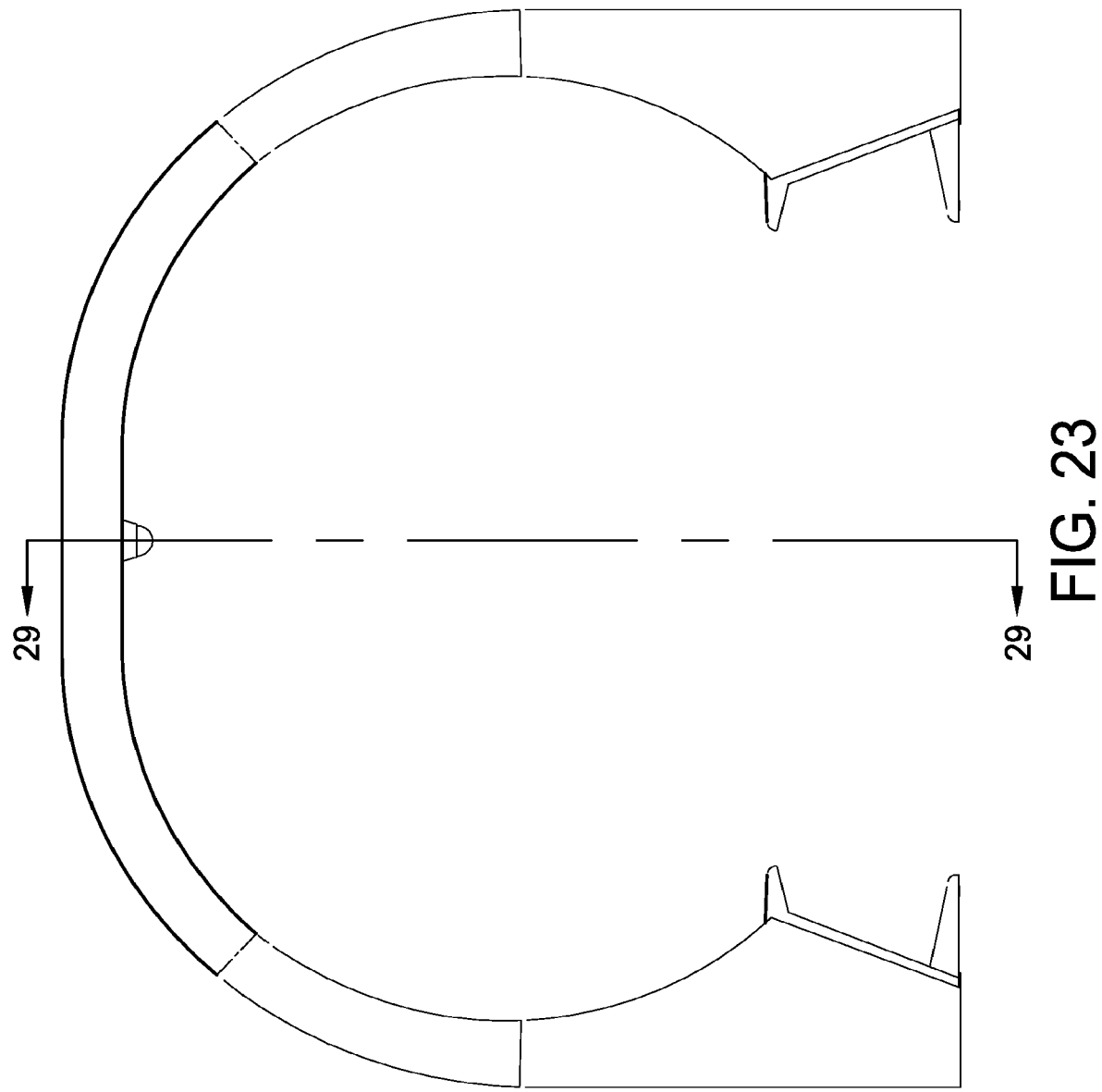
Figure 24:
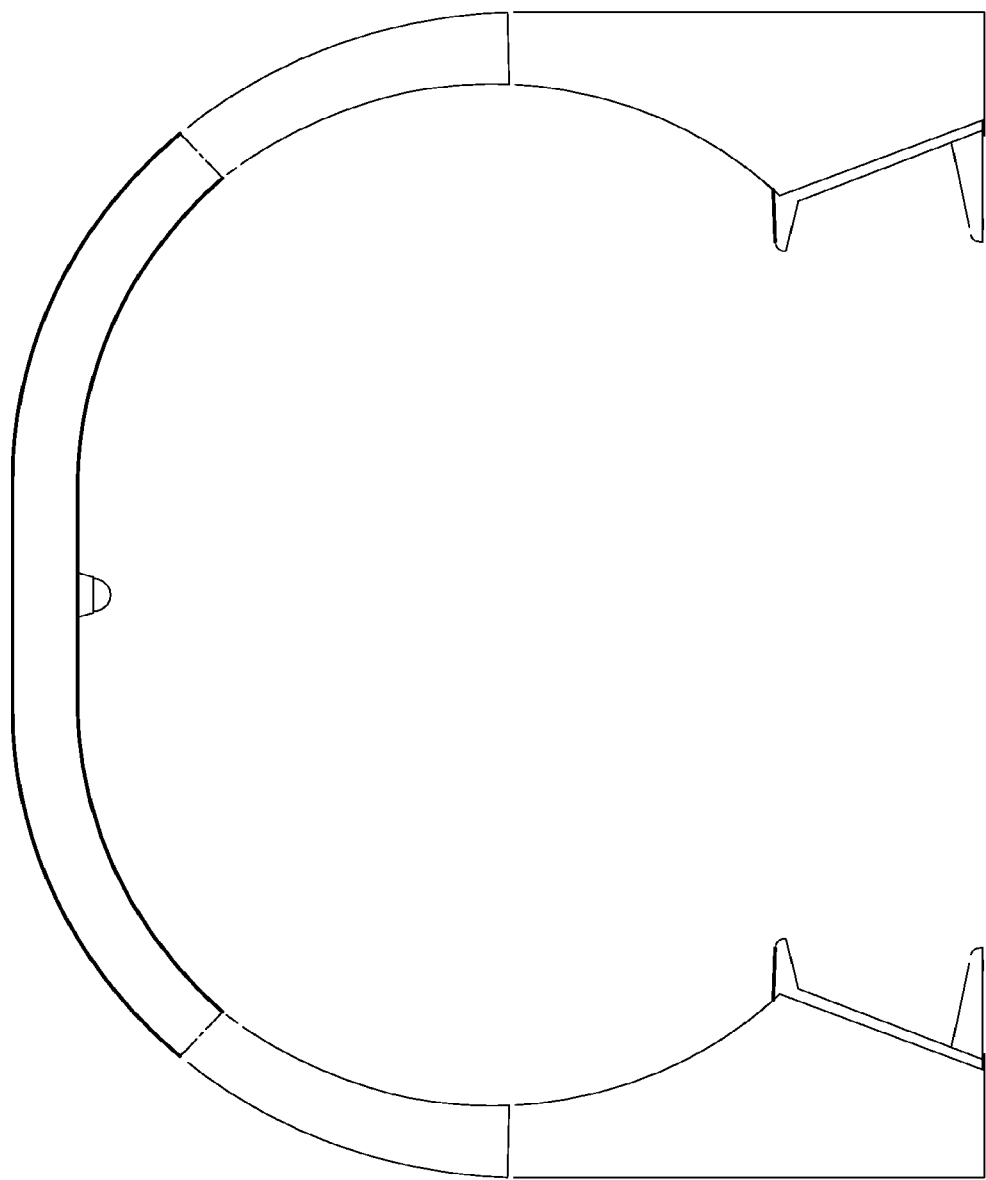
Figure 26:
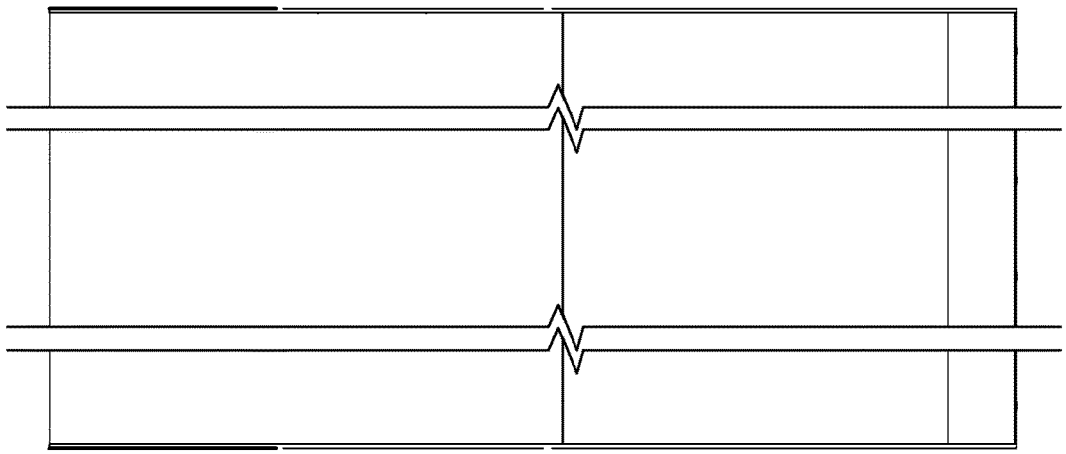
Figure 25:
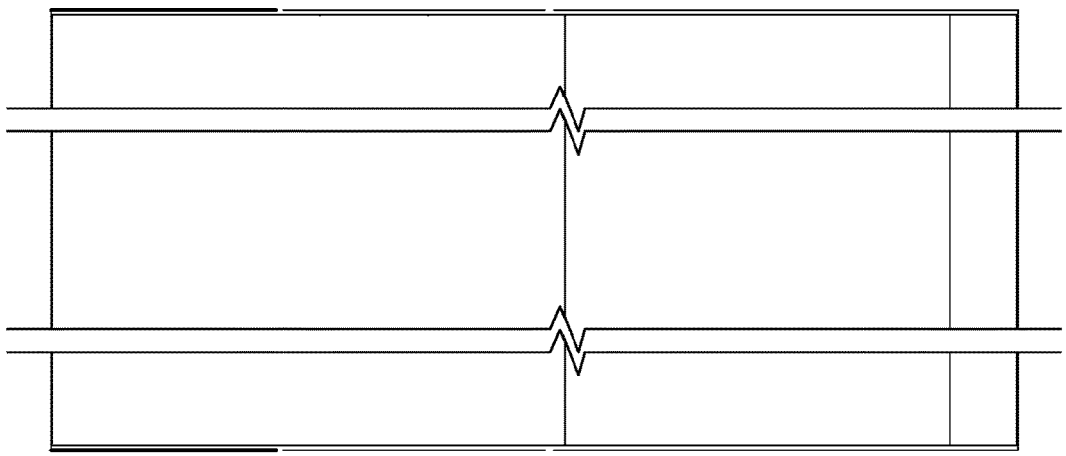
Figure 27:
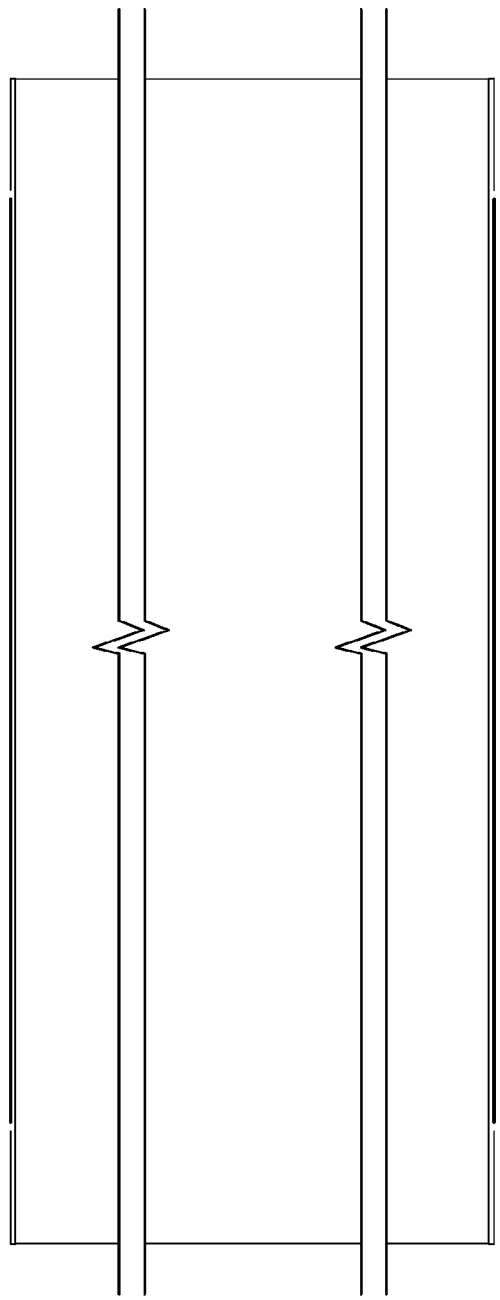
Figure 28:
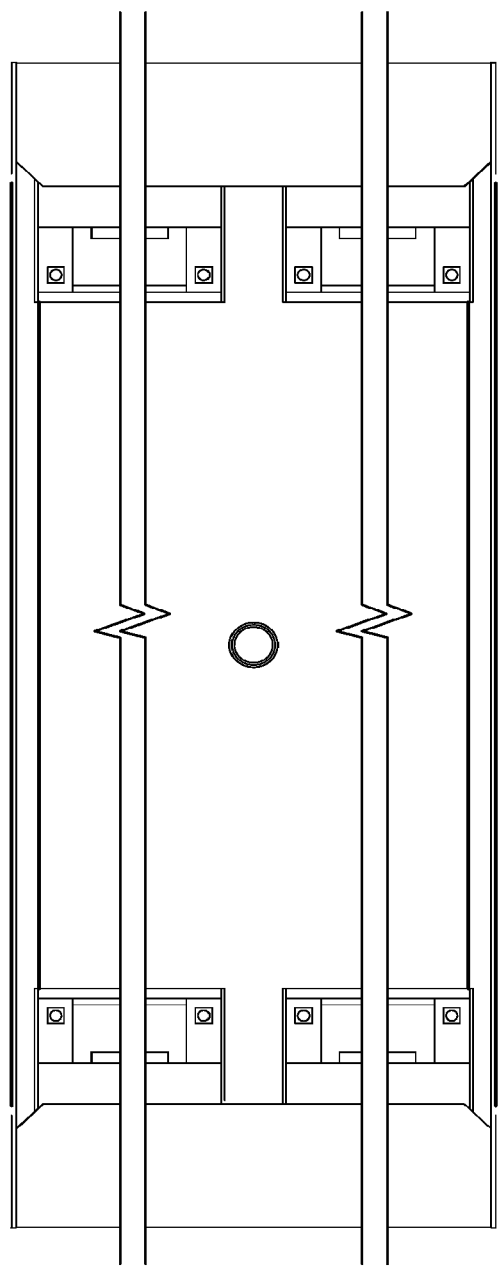
Figure 29:
Figure 30:
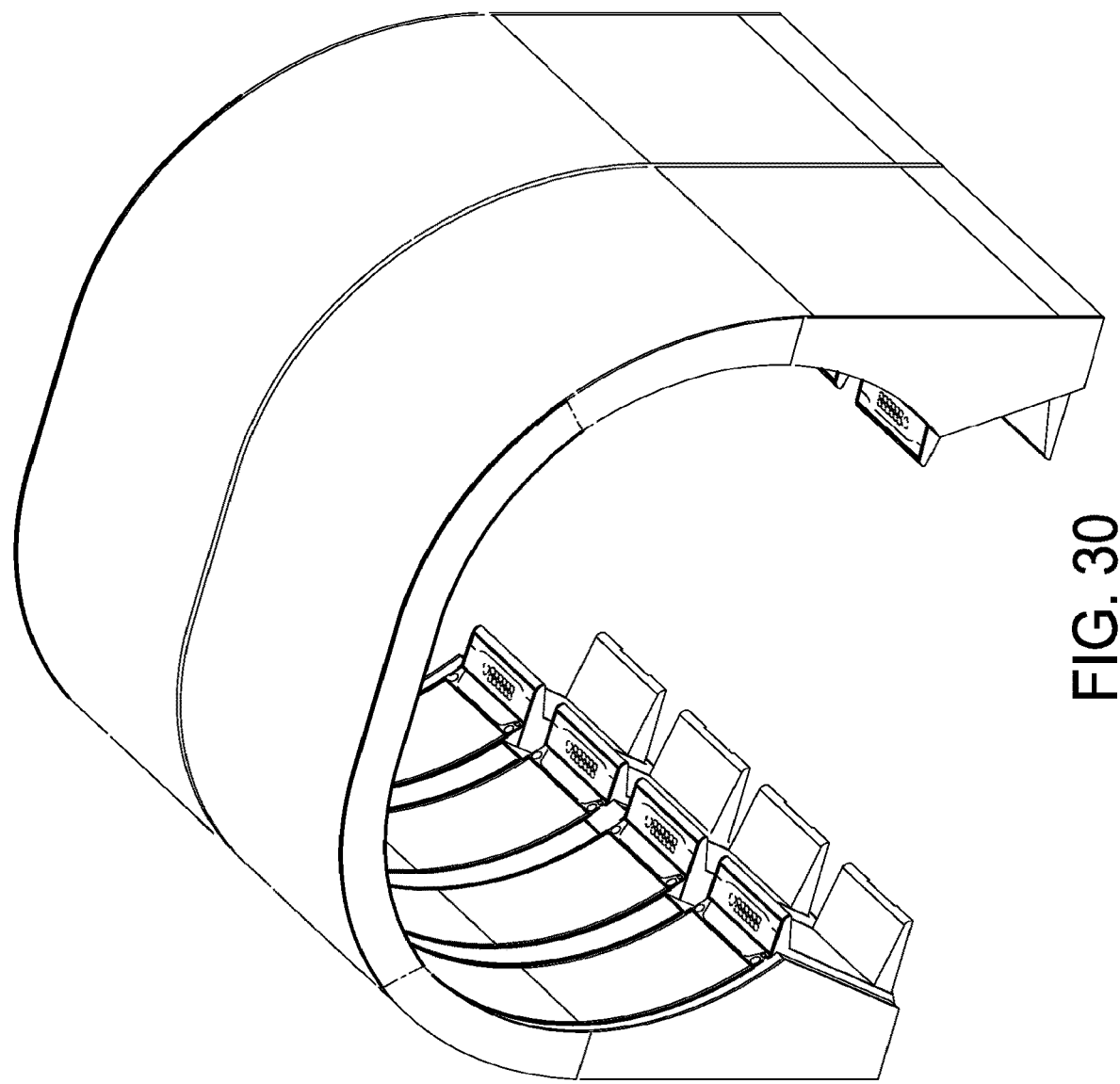
FIG. 30-FIG. 38 show different views of a fifth example embodiment of an EGM archway including a plurality of EGMs, as shown in FIG. 1 and FIG. 2, in which the plurality of EGMs and the EGM archway form a tunnel-shaped archway.
Figure 31:
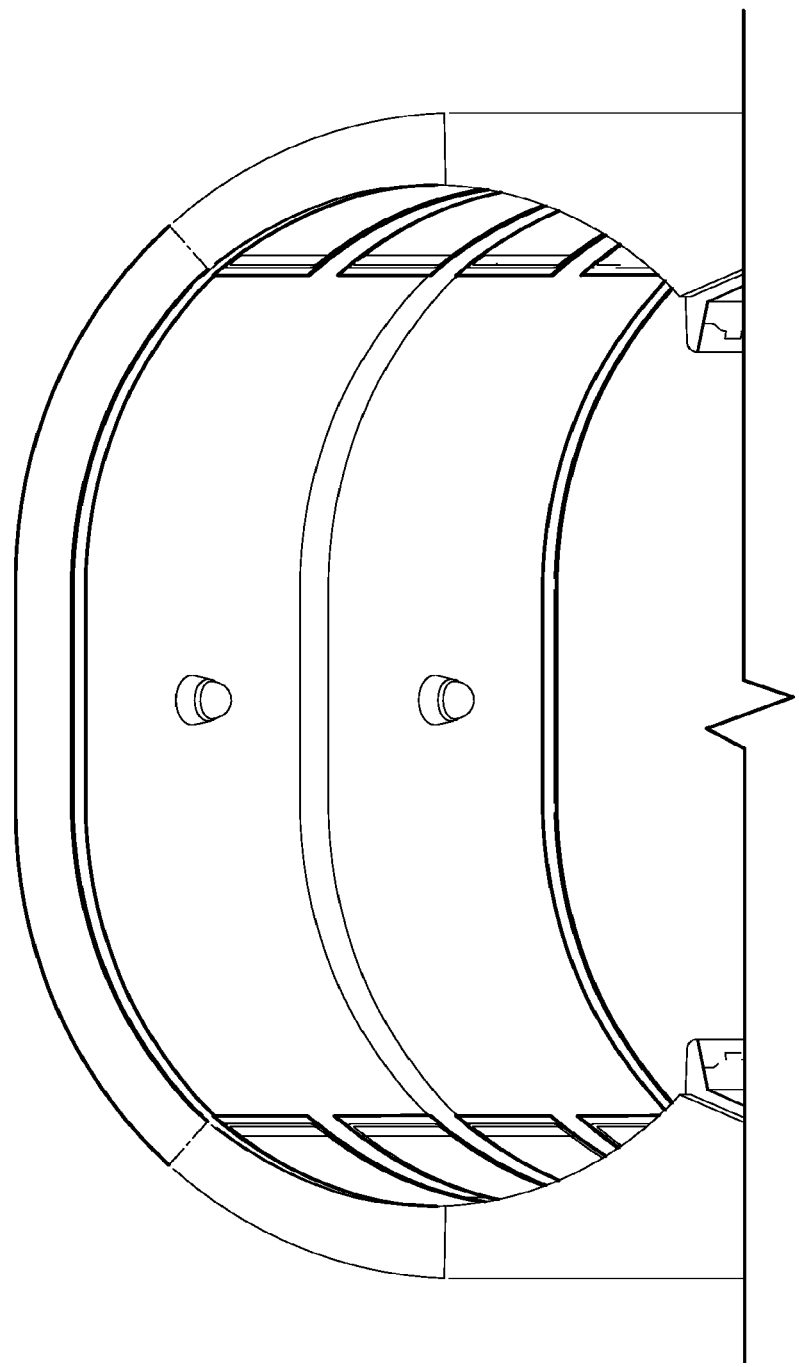
Figure 32:
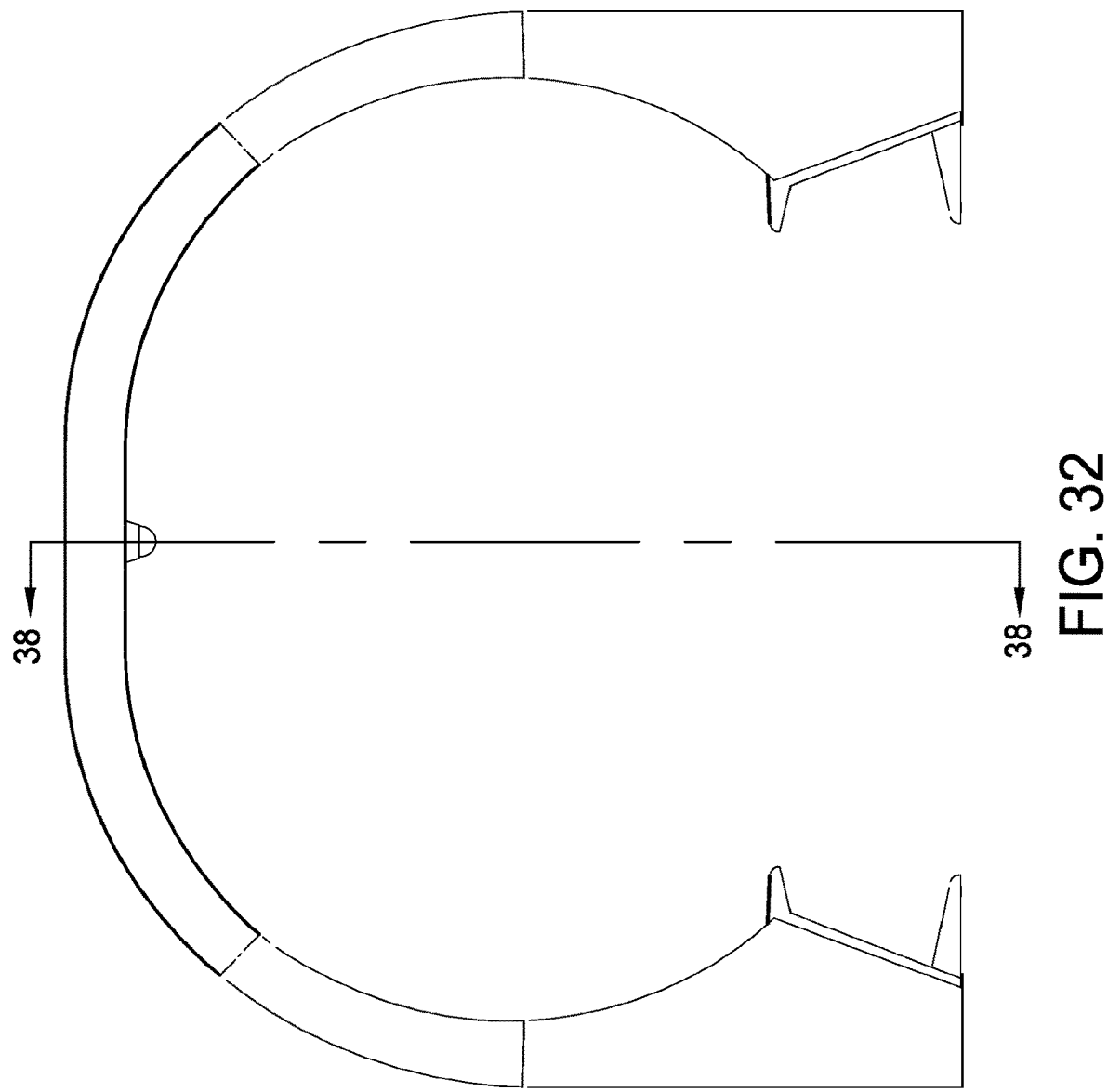
Figure 33:
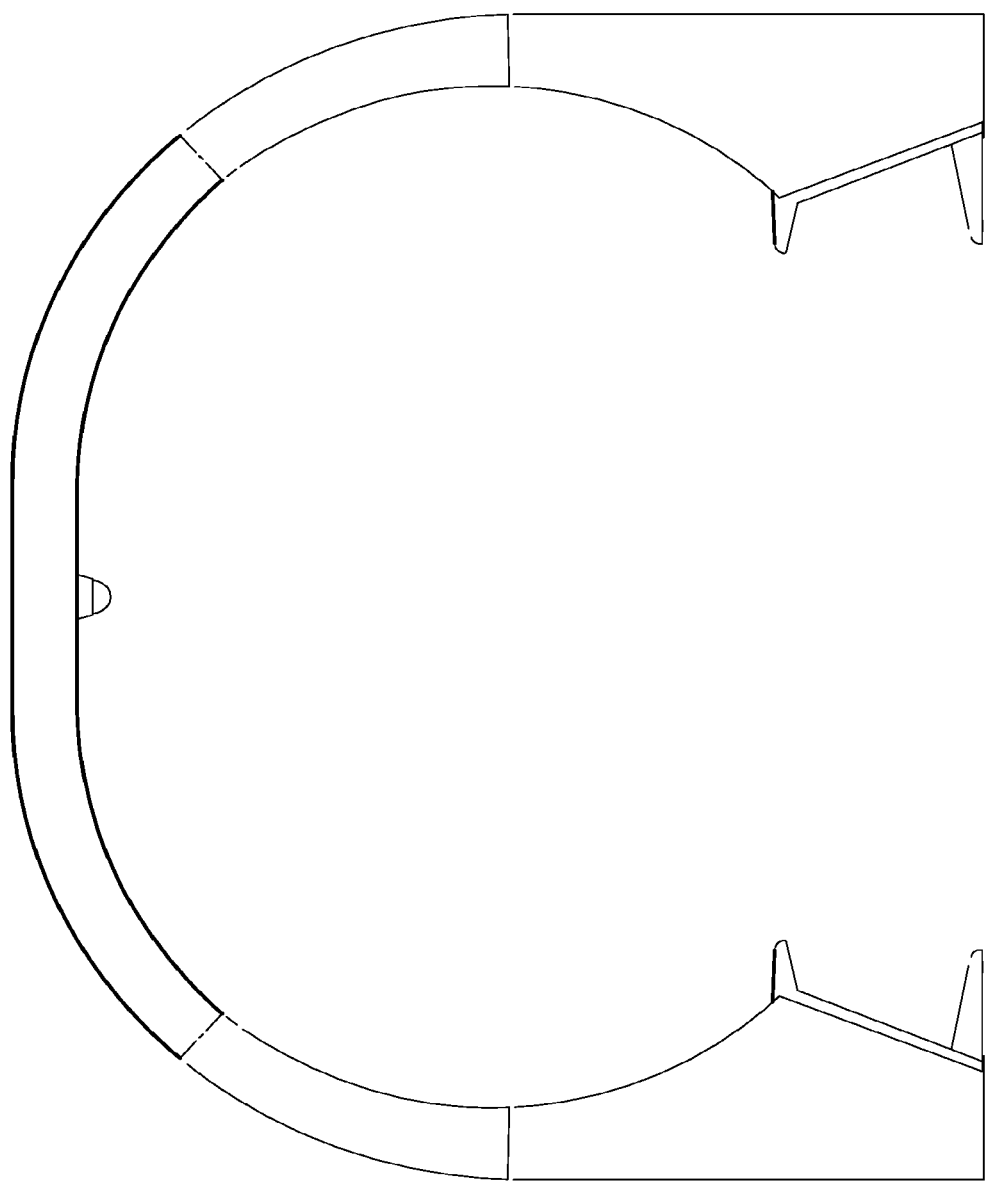
Figure 34:
Figure 35:
Figure 36:
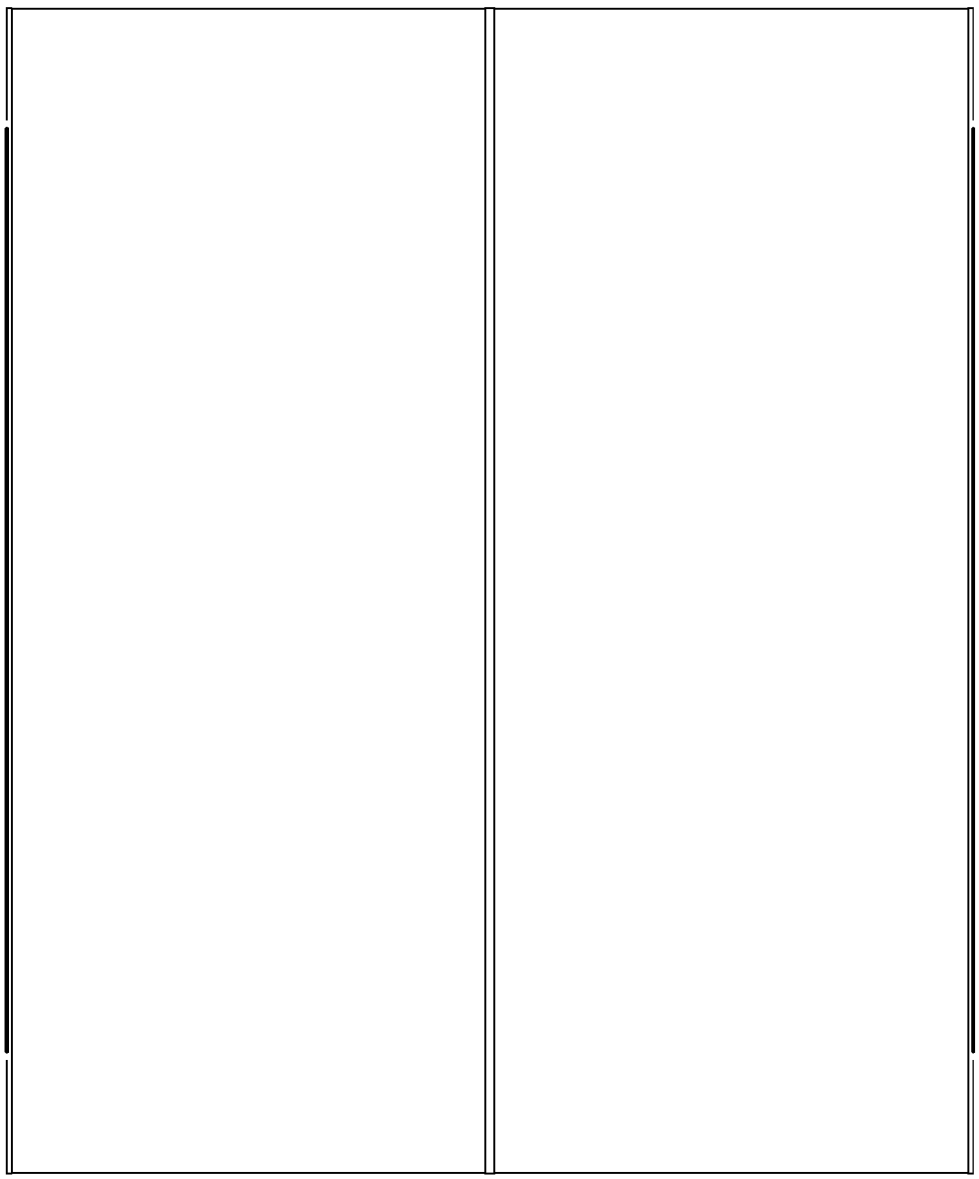
Figure 37:
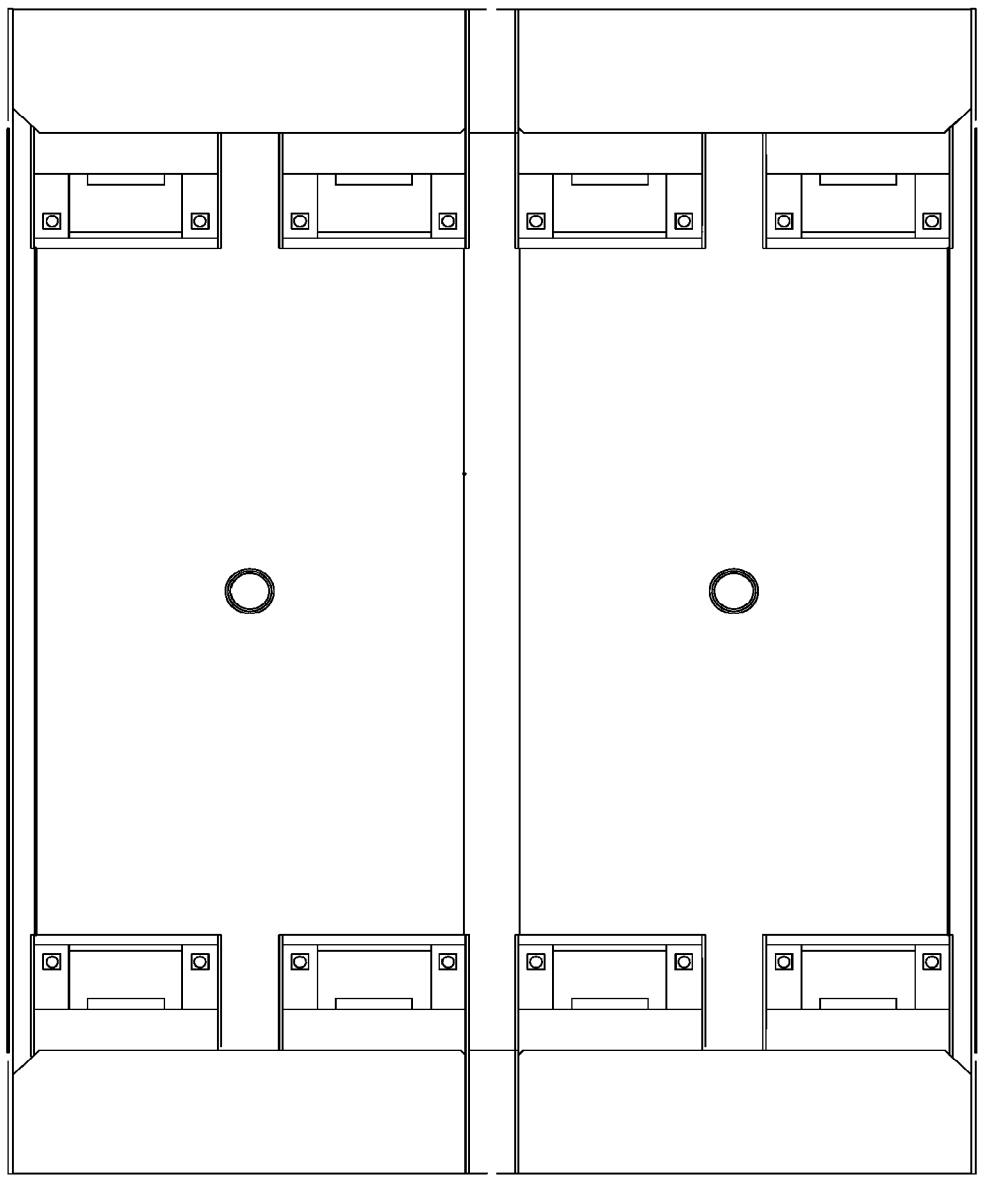
Figure 38:
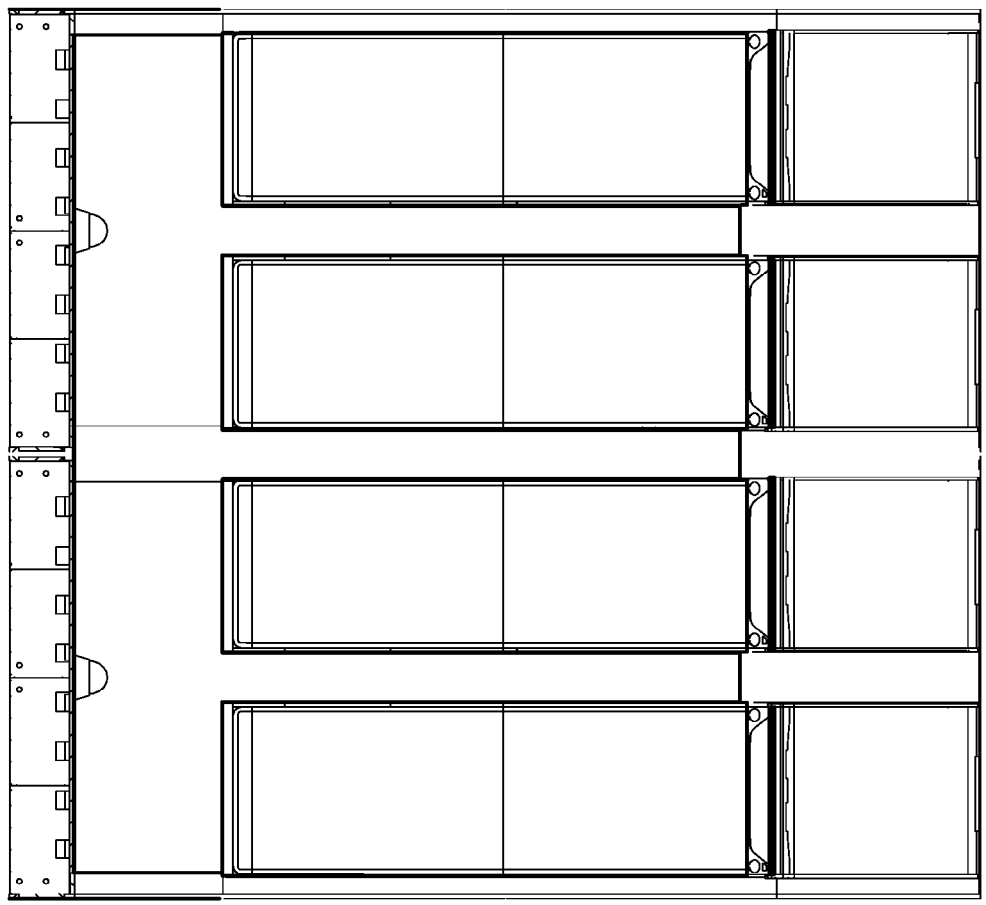
Figure 39:
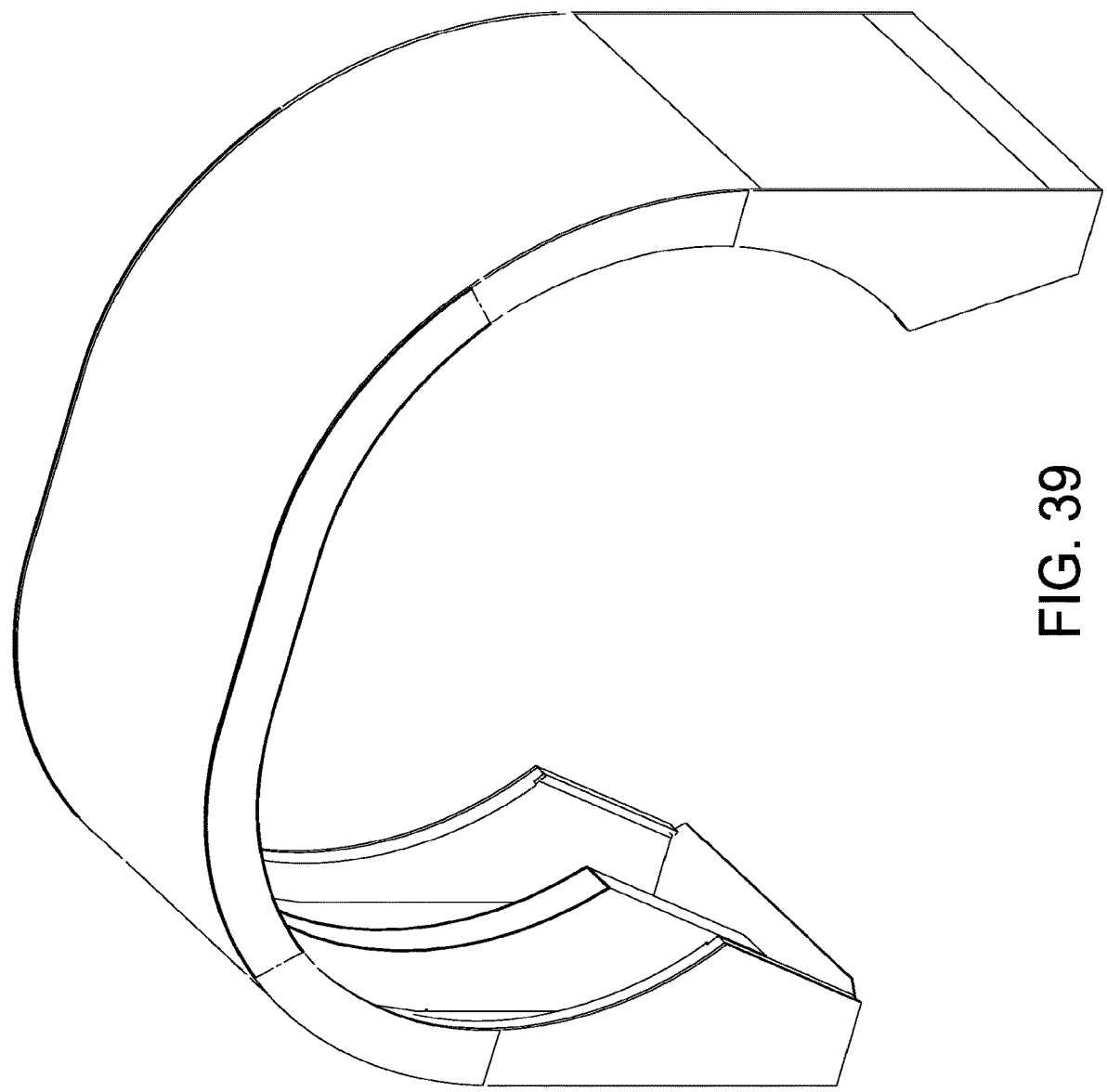
FIG. 39-FIG. 56 show different views of a sixth example embodiment of an EGM archway including a plurality of EGM receptables, each EGM receptacle configured to receive an EGM.
Figure 40:
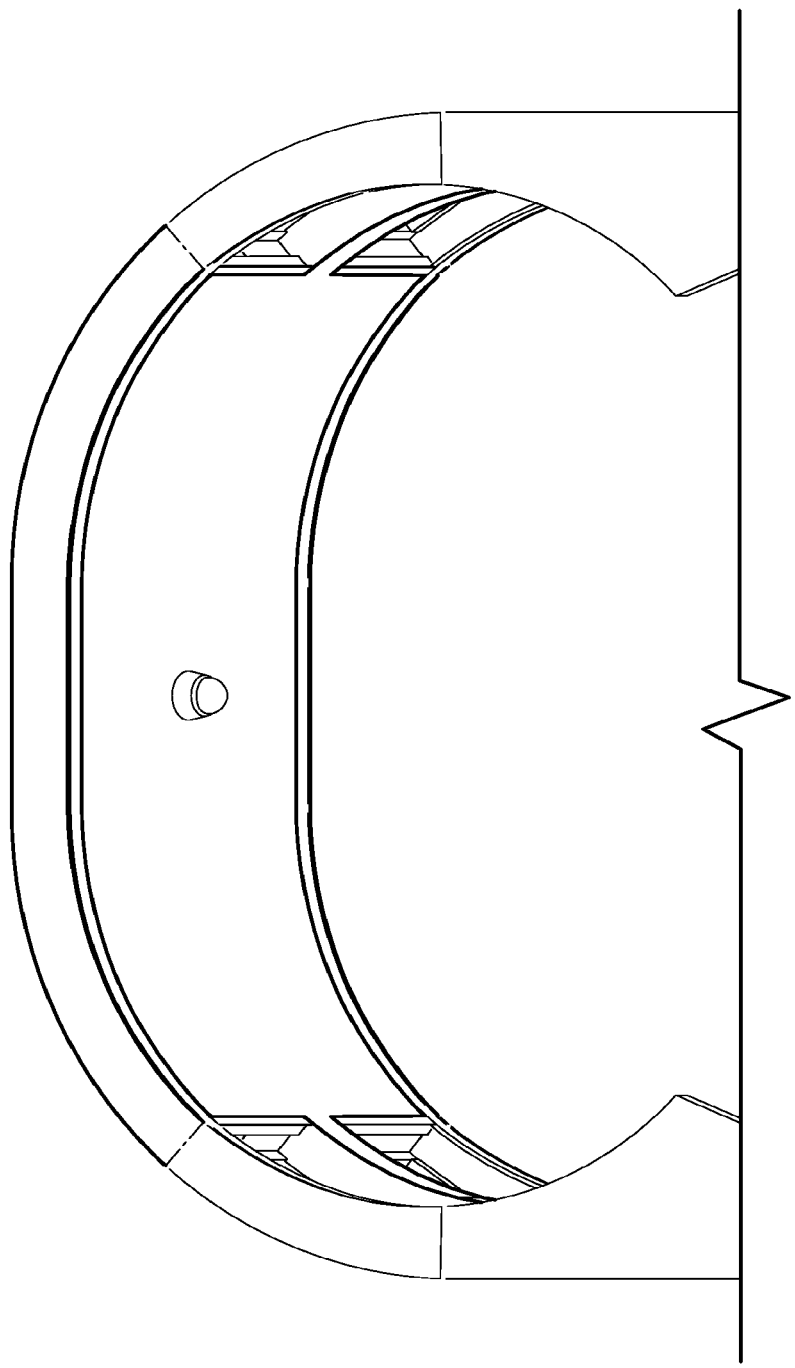
Figure 41:
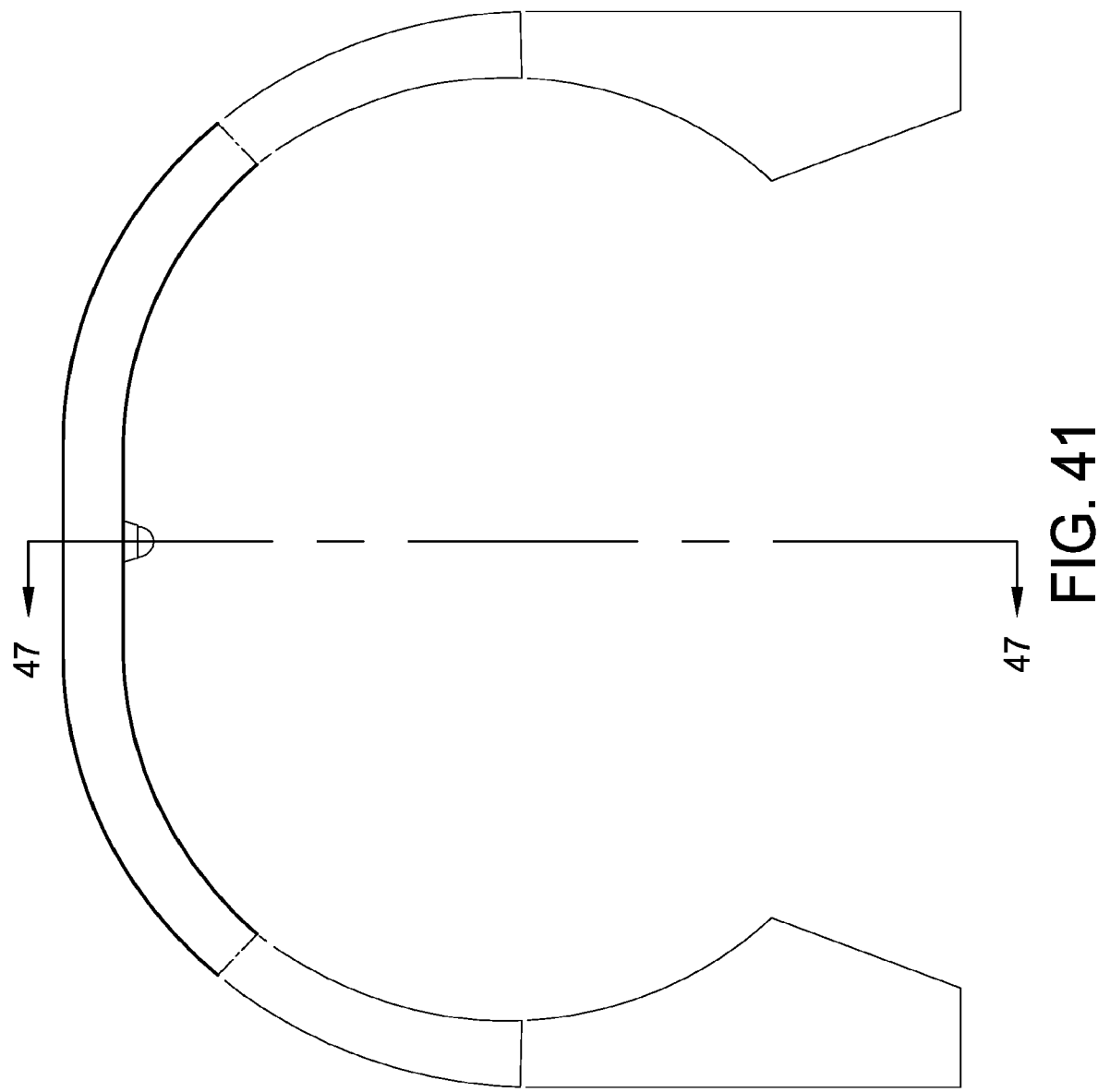
Figure 42:
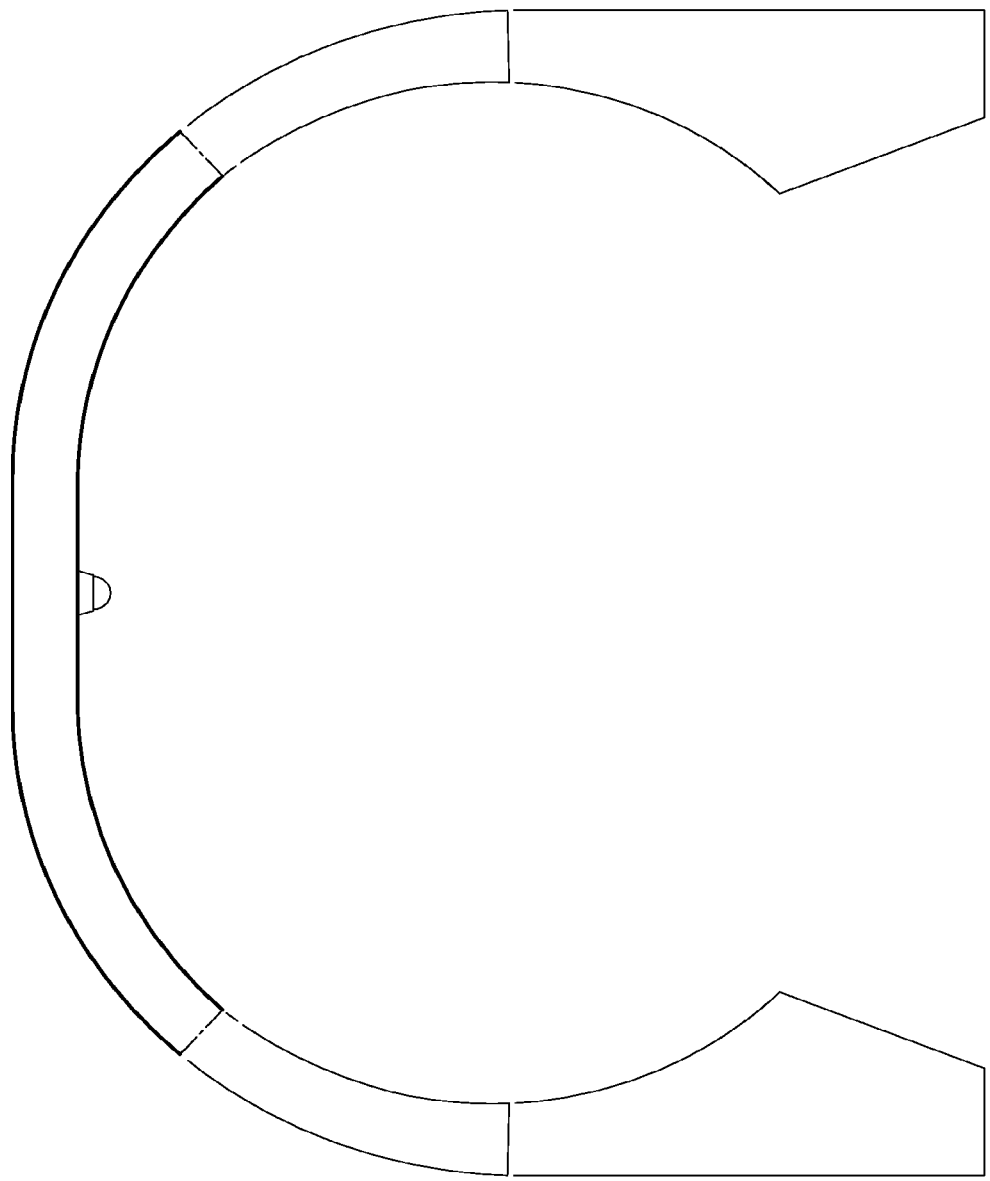
Figure 44:
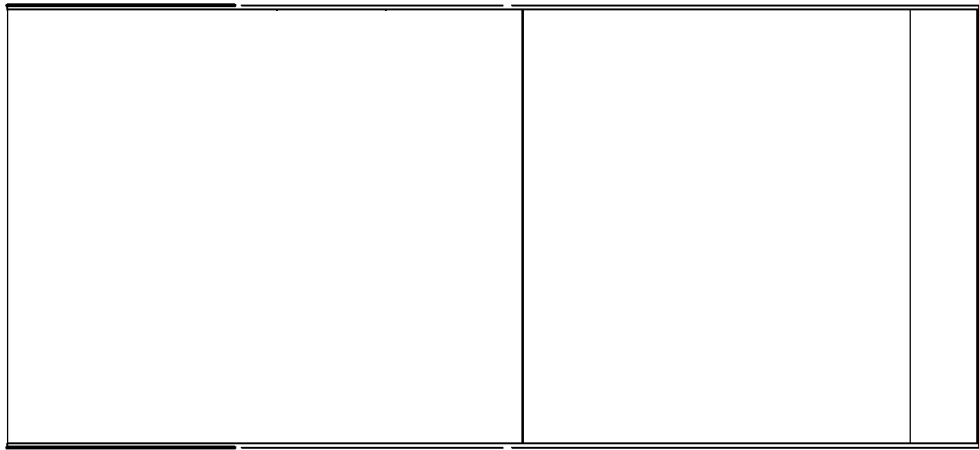
Figure 43:
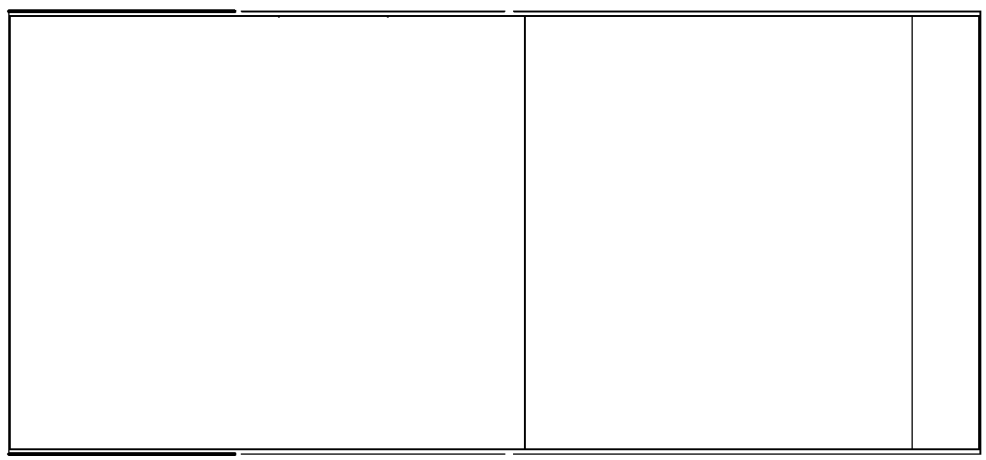
Figure 45:
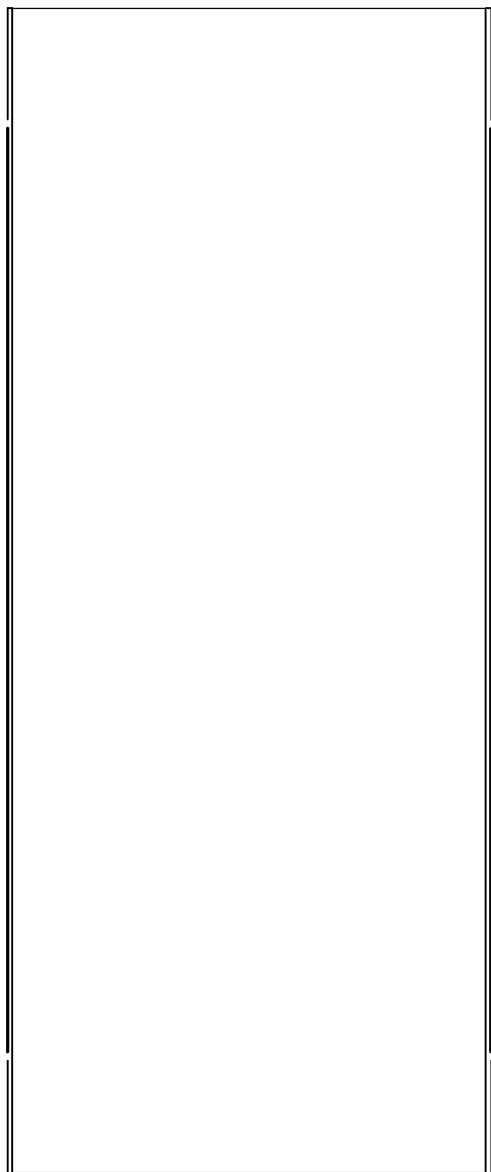
Figure 46:
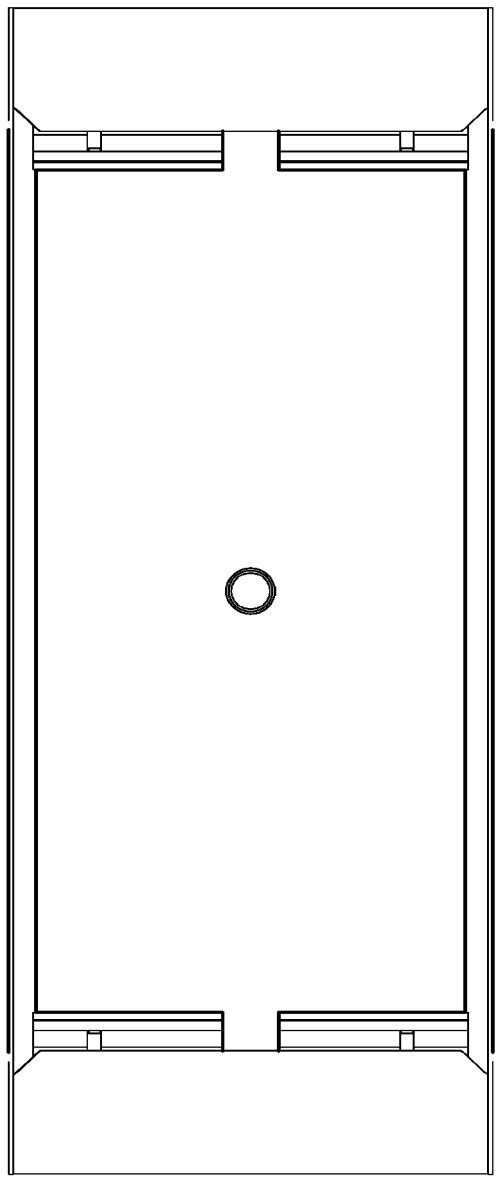
Figure 47:
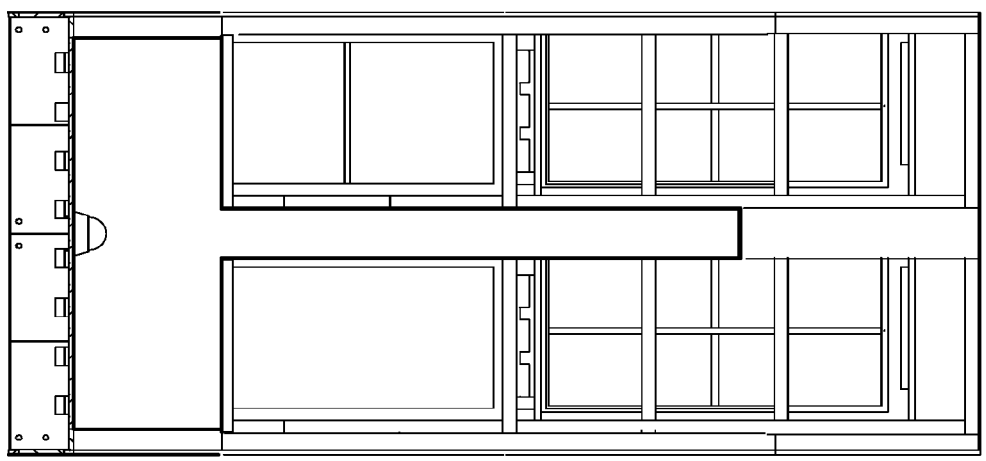
Figure 48:
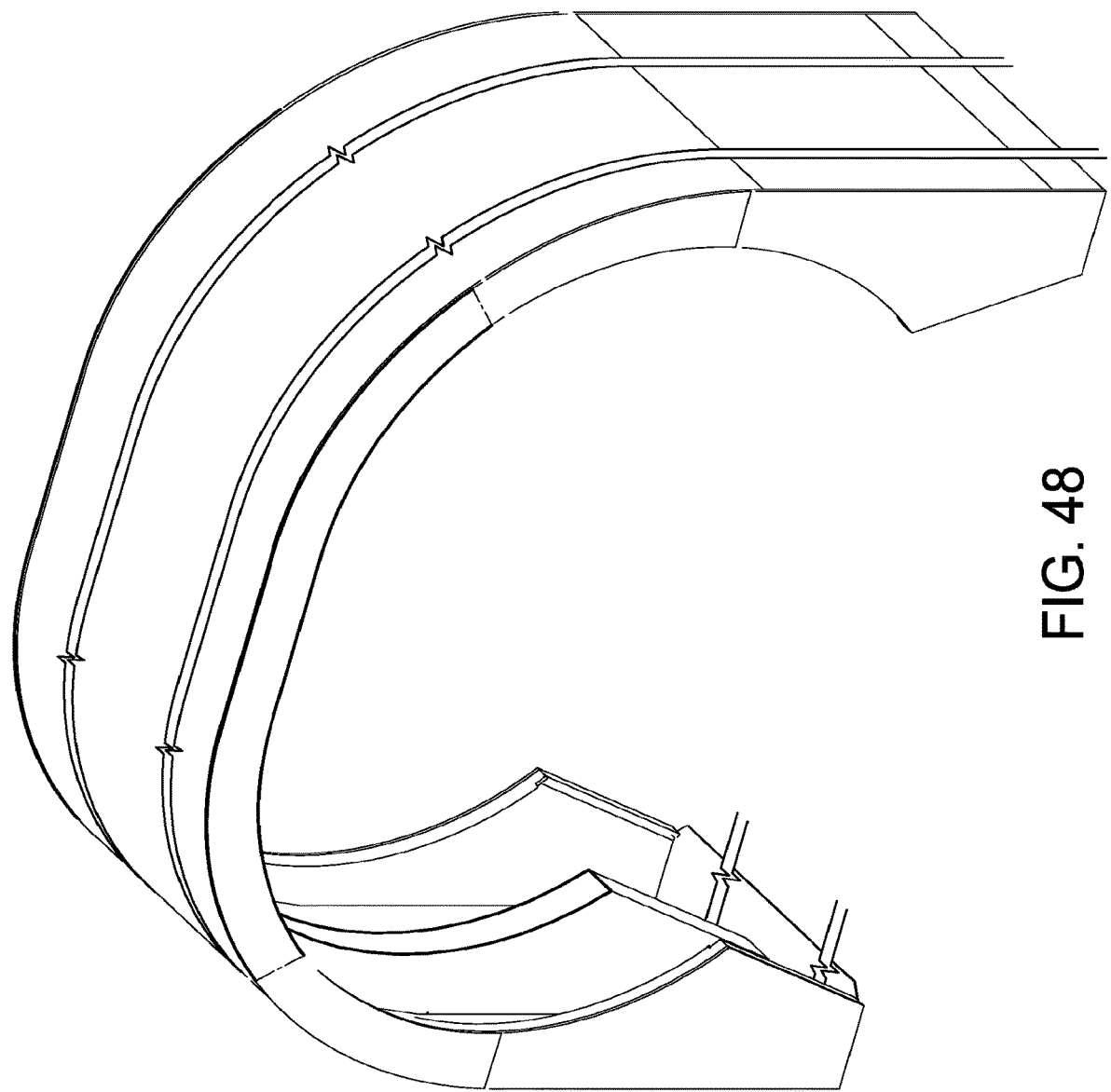
Figure 49:
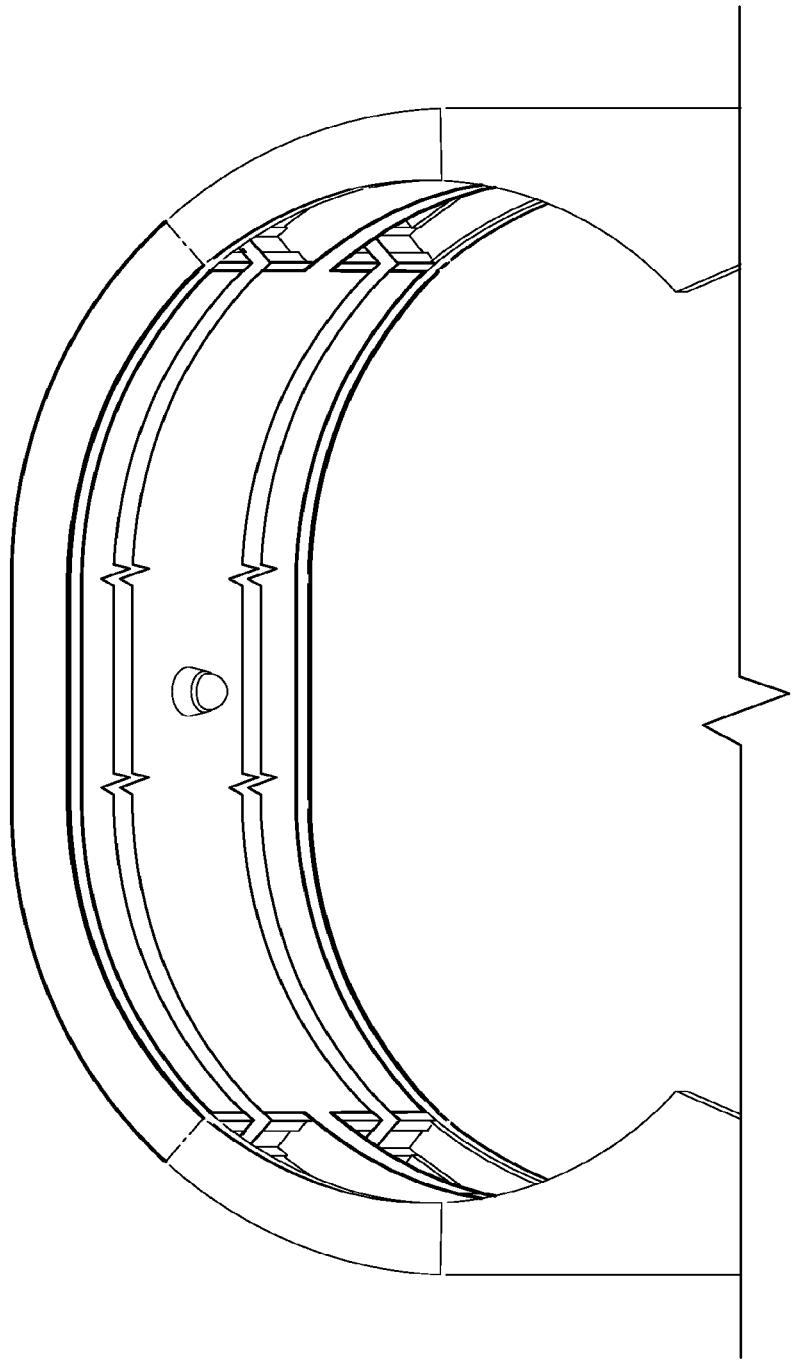
Figure 50:
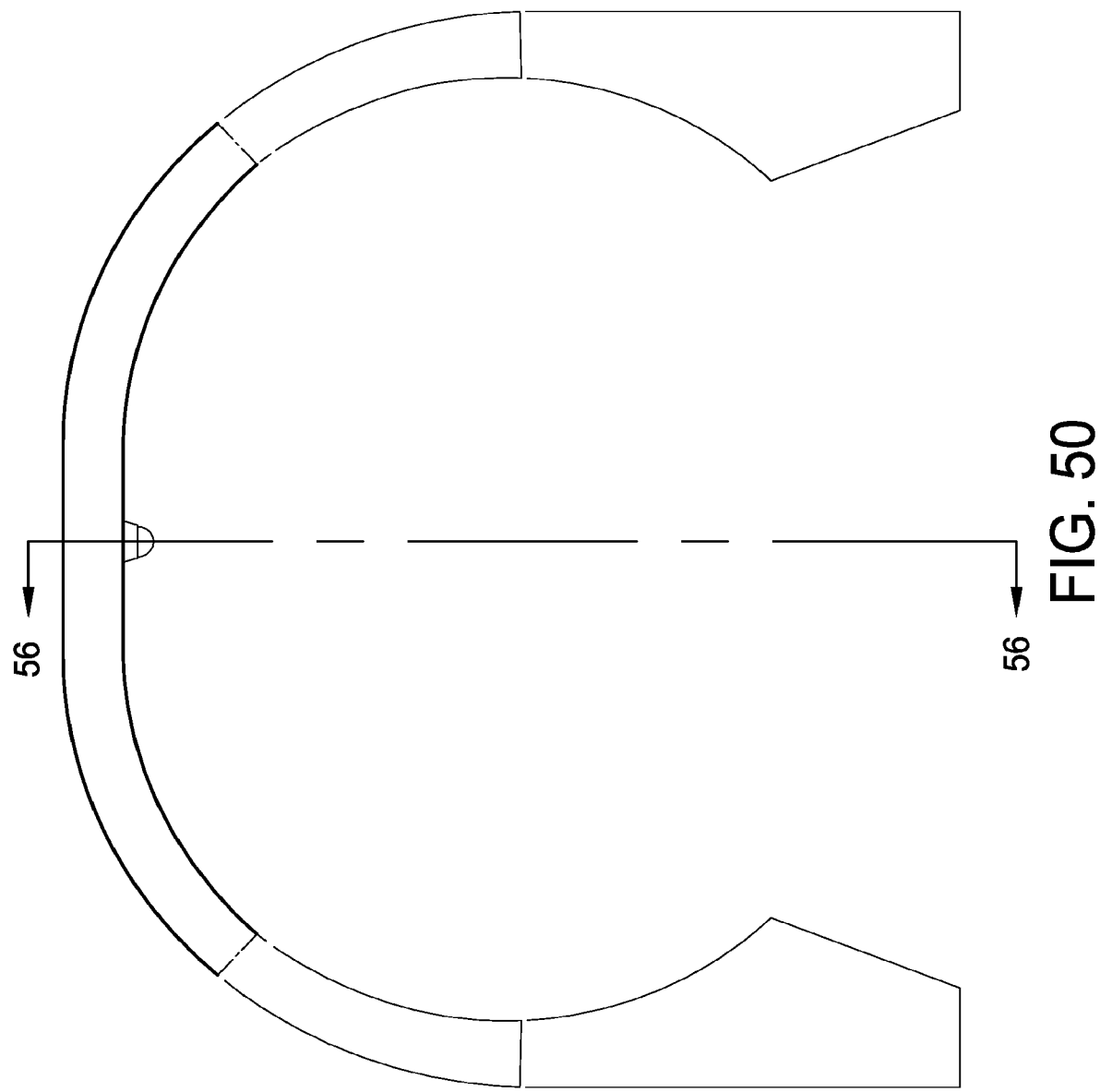
Figure 51:
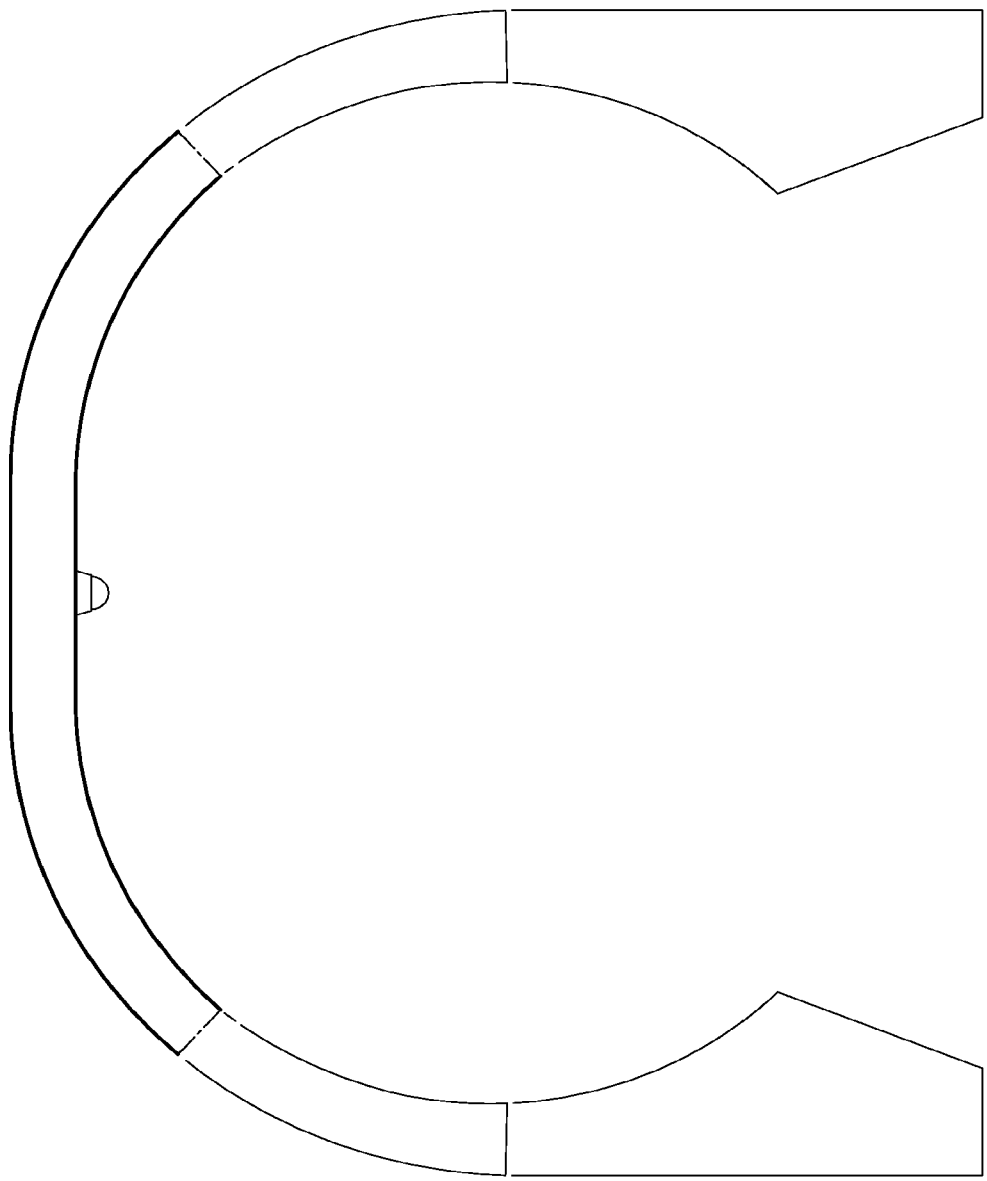
Figure 53:
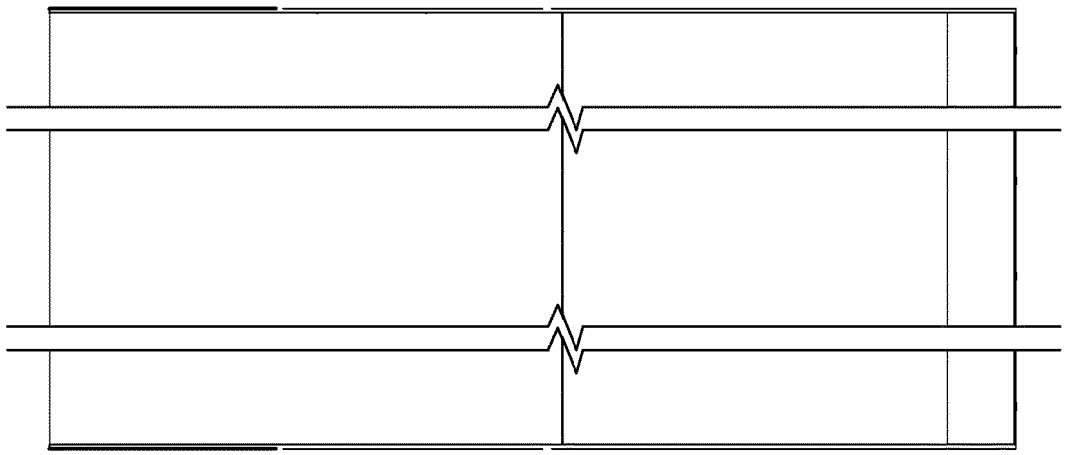
Figure 52:
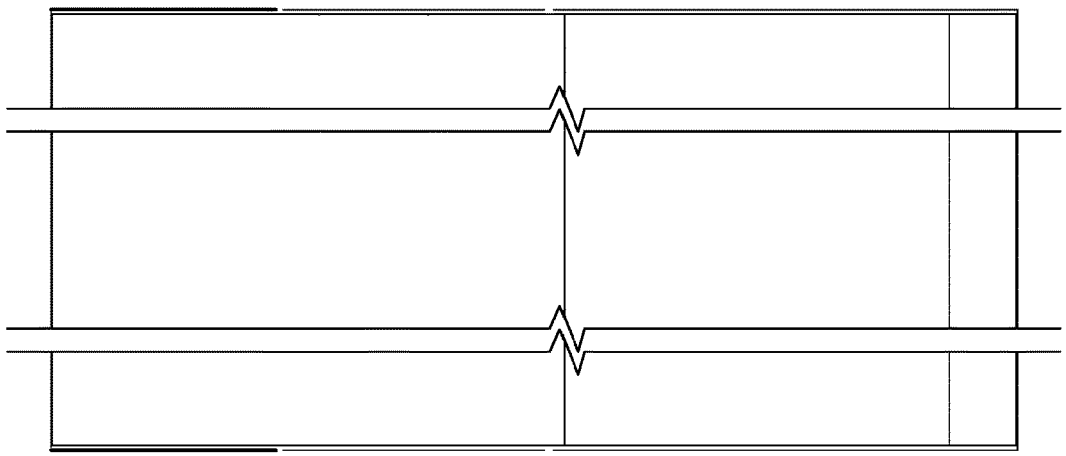
Figure 54:
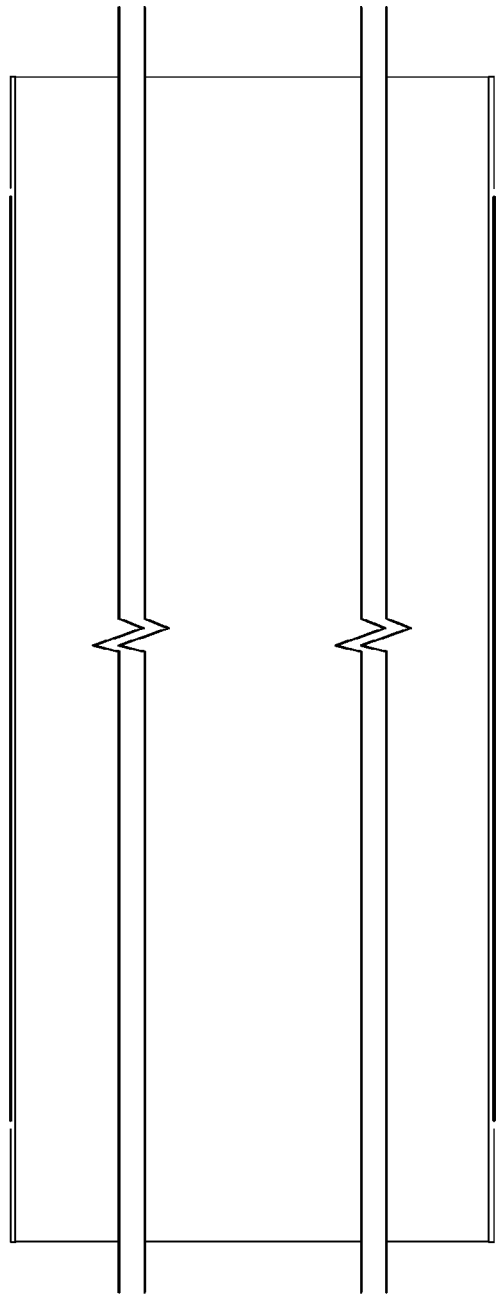
Figure 55:
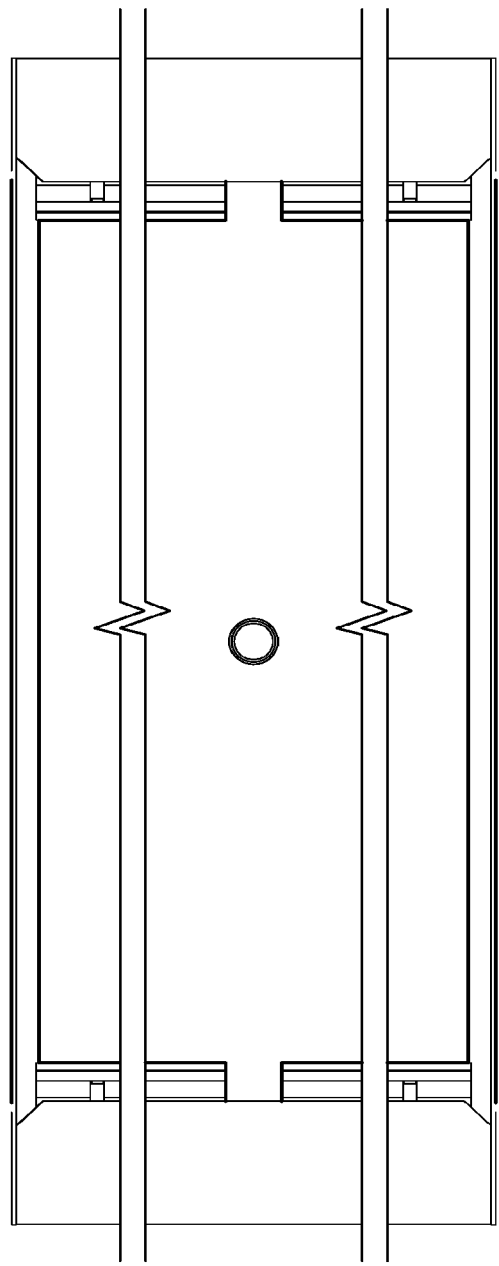
Figure 56:

FIG. 11 is a perspective view of a fourth example embodiment of the EGM archway 500, as shown with reference to FIG. 5. In the fourth example embodiment, EGM archway 500 includes a more rounded curvature, as described above. In this embodiment, archway 500 also includes the first EGM 502, the second EGM 504, the third EGM 506, and the fourth EGM 508. In general, EGMs 502-508 may include any suitable electronic gaming machine or gaming device, such as any of EGMs 104A-104X, as described herein. EGMs 502-508 may also include any of the computer architecture shown in FIG. 2 (with reference to gaming device or EGM 200).

A spacer display device 556 (or intermediate display device) may extend between second EGM 504 and the adjacent fourth EGM 508, substantially similarly to the third example embodiment described with reference to FIGS. 7-10 above. Similarly, another spacer display device (not shown) may extend between first EGM 502 and the third EGM 506. In some embodiments, spacer display device 556 is curved to match the curve of first curved display device 514, a second curved display device 516, first curved display device 522, and second curved display device 524. Further, in at least some embodiments, spacer display device 556 may span substantially an entire length or curvature of archway 500, such as between a level of the button decks of EGMs 502 and 506 on one side of archway 500 and the button decks of EGMs 504 and 508 on the other side of archway 500.

In some embodiments, spacer display device 556 extends from third overhead display device 534. In some further embodiments, spacer display device 556 is a part of third overhead display device 534. In other embodiments, spacer display device 556 is merely in contact with or in communication with third overhead display device 534, such that objects displayed on third overhead display device 534 may travel to spacer display device 556, and vice versa. In these embodiments, another spacer display device extends from, is in contact with, or is in communication with first overhead display device 530 (shown in FIG. 5).

In some embodiments, archway 500 may include a plurality of side-mounted display devices 558. Side-mounted display devices 558 (e.g., LED panels) may be included on one or more edges of archway 500, such as along a first edge 552 and/or along a second edge 554, e.g., substantially as described above with reference to the third example embodiment of FIGS. 7-10. As a result, in at least some embodiments, an edge 552 and/or 554 of archway 500 may also be configured to provide graphics.

In some embodiments, archway 500 may include back doors 560 (or access doors) to allow access to the back of EGMs 502-508. Back doors 560 may be fastened to the archway 500 using a variety of fastening mechanisms, including, but not limited to, bolts, screws, locking bolts, and magnets. Furthermore, the back doors 560 may include one or more detection mechanisms for detected when the back doors 560 are opened to prevent unauthorized access.

In some embodiments, the back doors 560 are configured to allow for EGMs 502-508 to be removed from the archway 500, such as for replacing a defective EGM, swapping an EGM 502-508 out for another EGM, and the like. Furthermore, each EGM 502-508 may slide in and out of the archway 500, such as on a wheeled carriage and/or using any other suitable mechanism for relocating EGMs. In some embodiments, archway 500 includes a series of rails or other guiding mechanisms to position the newly installed EGM. The EGM may then be mechanically, electrically, and/or communicatively connected to the archway 500 to allow for communication with the archway 500.

FIG. 39-FIG. 56 show different views of a sixth example embodiment of an EGM archway 3900, including a plurality of EGM receptacles, such as a first EGM receptacle 3902, a second EGM receptacle 3904, a third EGM receptacle 3906, and a fourth EGM receptacle 3908. Archway 3900 may be substantially similar to archway 300 and/or archway 500 (including a plurality of overhead display portions and/or overhead display devices), except that EGMs may be initially omitted from archway 3900.

More particularly, each EGM receptacle 3902-3908 may be configured to receive an EGM (e.g., an EGM 302-308 and/or an EGM 502-508), such as by wheeling, sliding, and/or otherwise positioning an EGM within a respective receptacle. Each receptacle 3902-3908 may include one or more connection ports or connects (e.g., input/output ports) for electrically, mechanically, and/or communicatively coupling an EGM within a respective receptacle 3902-3908 to archway 3900.

As a result, EGMs may be swapped in and out of archway 3900 in real time and/or on the fly. In addition, during installation, EGM archway 3900 may be positioned within a casino prior to including the one or more (heavier) EGMs within archway 3900. As a result, one technical improvement embodied by the present invention is that archway 3900 may be more easily positioned within a casino. Further, archway 3900 may include input/output ports configured for communication with a variety of brands or types of EGM, whereby EGMs of a variety of manufacturers may be "plugged in" to archway 3900 and interoperable with archway 3900.

EGM archways are thus described. These EGM archways may include a plurality of EGMs, arranged in spatially opposing pairs, each having one or more curved display screens. The curved display screens of each EGM pair may form a lower portion of an arc of either archway, and a plurality of curved and or planar display screens may be added between the two lower portions of either archway to complete a curvature of the archways. In addition, EGMs may be positioned side-by-side to create longer or shorter archways, such as ring-shaped and tunnel-shaped archways. In operation, a variety of animations and graphics may be displayed within the archways, and EGMs forming the archways may interact or influence each other, such as by sending graphics or game awards across the archways to one or more other EGMs.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming system comprising at least one processor and at least one memory device with instructions stored thereon that, in response to execution by the at least one processor, cause the at least one processor to:
cause display of at least one animation on at least one display device of an overhead display device, wherein the overhead display device extends between a first electronic gaming machine (EGM) receptacle configured to receive a first EGM and a second EGM receptacle configured to receive a second EGM; and
control the at least one animation to be displayed as traveling on the at least one display device between the first EGM receptacle and the second EGM receptacle.

2. The electronic gaming system of claim 1, wherein the overhead display device comprises a curvature forming an archway.

3. The electronic gaming system of claim 1, wherein the at least one display device comprises a first display face, a second display face, and a third display face, the second display face extending orthogonally from the first display face and defining a first edge of the overhead display device, and the third display face extending orthogonally away from the first display face and defining a second edge of the overhead display device.

4. The electronic gaming system of claim 3, wherein first display face comprises a second at least one display device, the second display face comprises a third at least one display device, and the third display face comprises a fourth at least one display device.

5. The electronic gaming system of claim 1, wherein the overhead display device further comprises a second at least one display device associated with the first EGM receptacle and a third at least one display device associated with the second EGM receptacle.

6. The electronic gaming system of claim 5, wherein the instructions further cause the at least one processor to control display of the at least one animation as extending between the second at least one display device and the third at least one display device.

7. The electronic gaming system of claim 6, wherein the second at least one display device comprises at least one curved display device and the third at least one display device comprises another at least one curved display device.

8. The electronic gaming system of claim 1, wherein the first EGM receptacle is spaced apart from and diametrically opposing the second EGM receptacle.

9. The electronic gaming system of claim 1, further comprising a first EGM in the first EGM receptacle and a second EGM in the second EGM receptacle.

10. The electronic gaming system of claim 9, wherein the first EGM comprises a first curved display device and the second EGM comprises a second curved display device.

11. An overhead display system, the overhead display system comprising:
an electronic gaming machine (EGM) comprising an EGM display device comprising an upper edge; and
an overhead display device comprising a first edge positioned adjacent to the upper edge of the EGM display device, a second edge, and at least one display panel extending between the first edge and the second edge, wherein the first edge and the second edge are spaced apart a distance.

12. The overhead display system of claim 11, wherein the overhead display device further comprises a first display face, a second display face, and a third display face, the second display face extending orthogonally from the first display face and defining a first border of the overhead display device, and the third display face extending orthogonally away from the first display face and defining a second border of the overhead display device.

13. The overhead display system of claim 11, wherein the second edge of the overhead display device is positioned adjacent to an upper edge of a second EGM.

14. The overhead display system of claim 13, wherein the second EGM is spaced apart from and diametrically opposing the EGM.

15. The overhead display system of claim 14, wherein a processor is configured to control display of an animation traveling between the first edge of the overhead display device and the second EGM.

16. The overhead display system of claim 11, wherein the second edge is spaced apart from and diametrically opposing the EGM.

17. An electronic gaming machine (EGM) comprising:
a display panel comprising an upper edge; and
an overhead display panel comprising a first edge positioned adjacent to the upper edge of the display panel, a second edge, and a second display panel extending between the first edge and the second edge, wherein the display panel and the second display panel define an overhead display device, and wherein the first edge and the second edge are spaced apart a distance.

18. The EGM of claim 17, wherein the second edge of the overhead display panel is positioned adjacent to an upper edge of a second EGM.

19. The EGM of claim 18, wherein the second EGM is spaced apart from and diametrically opposing the EGM.

20. The EGM of claim 17, wherein the second edge is spaced apart from and diametrically opposing the EGM.

* * * * *